Figure 22:
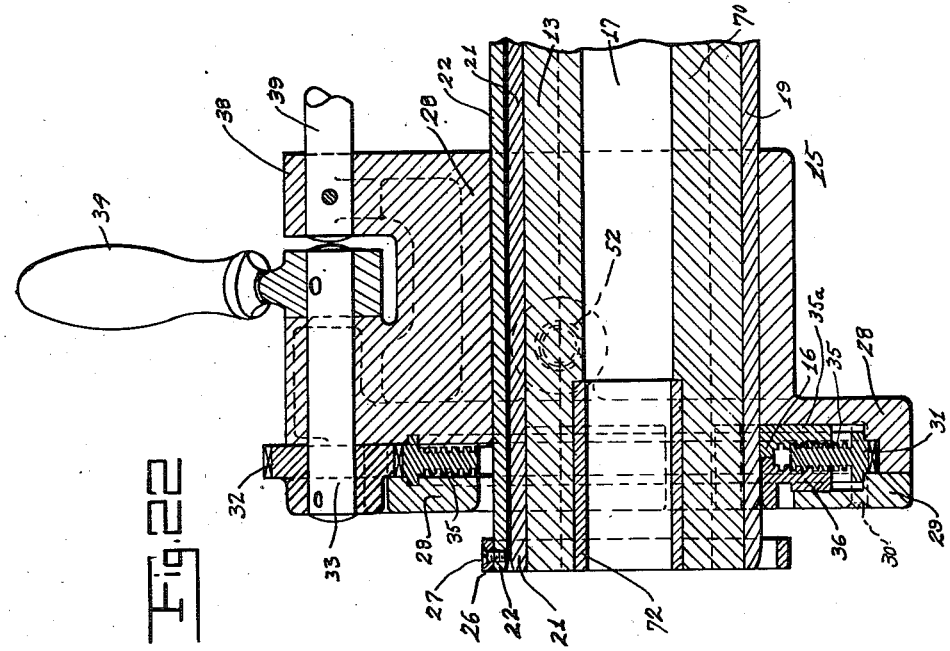

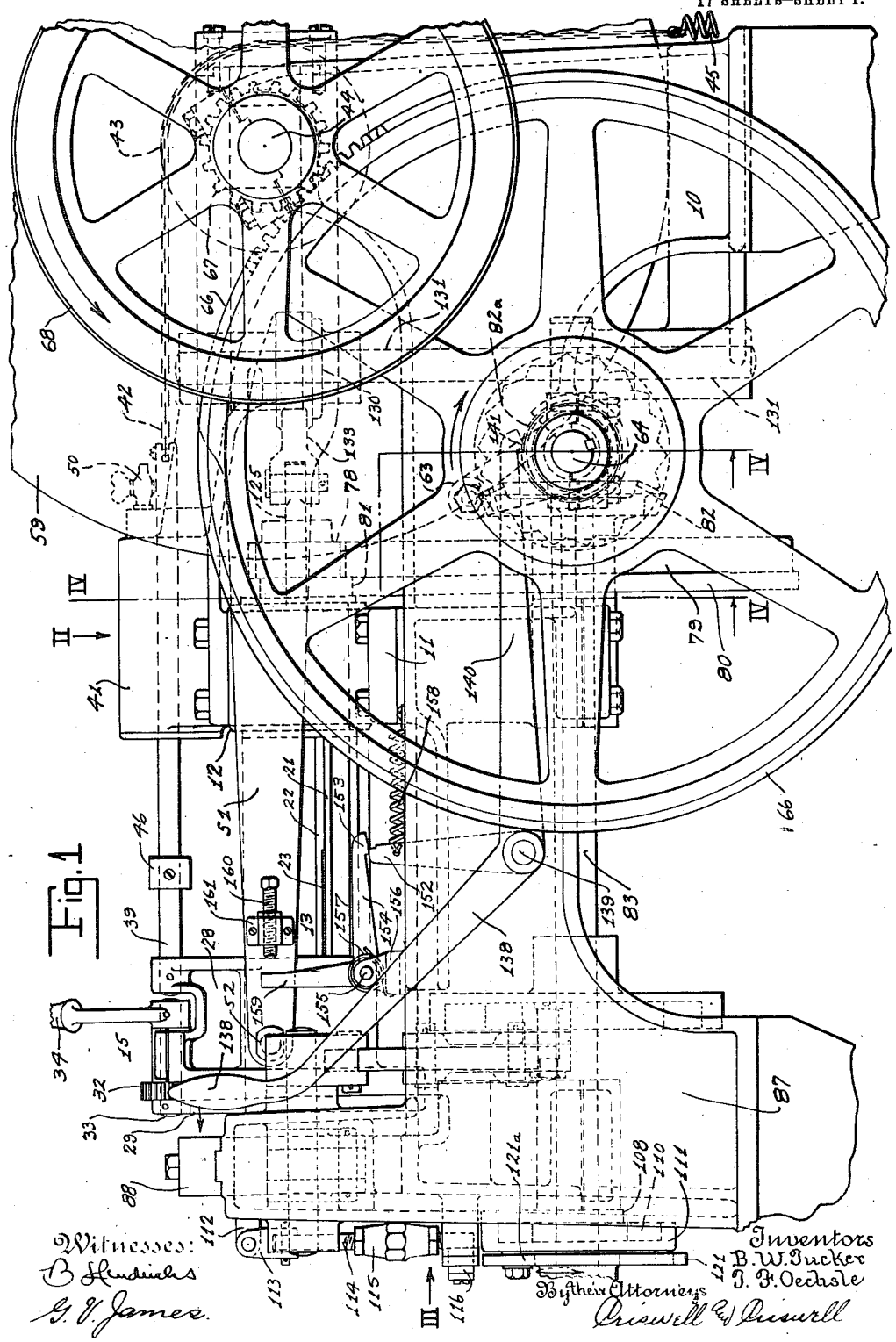

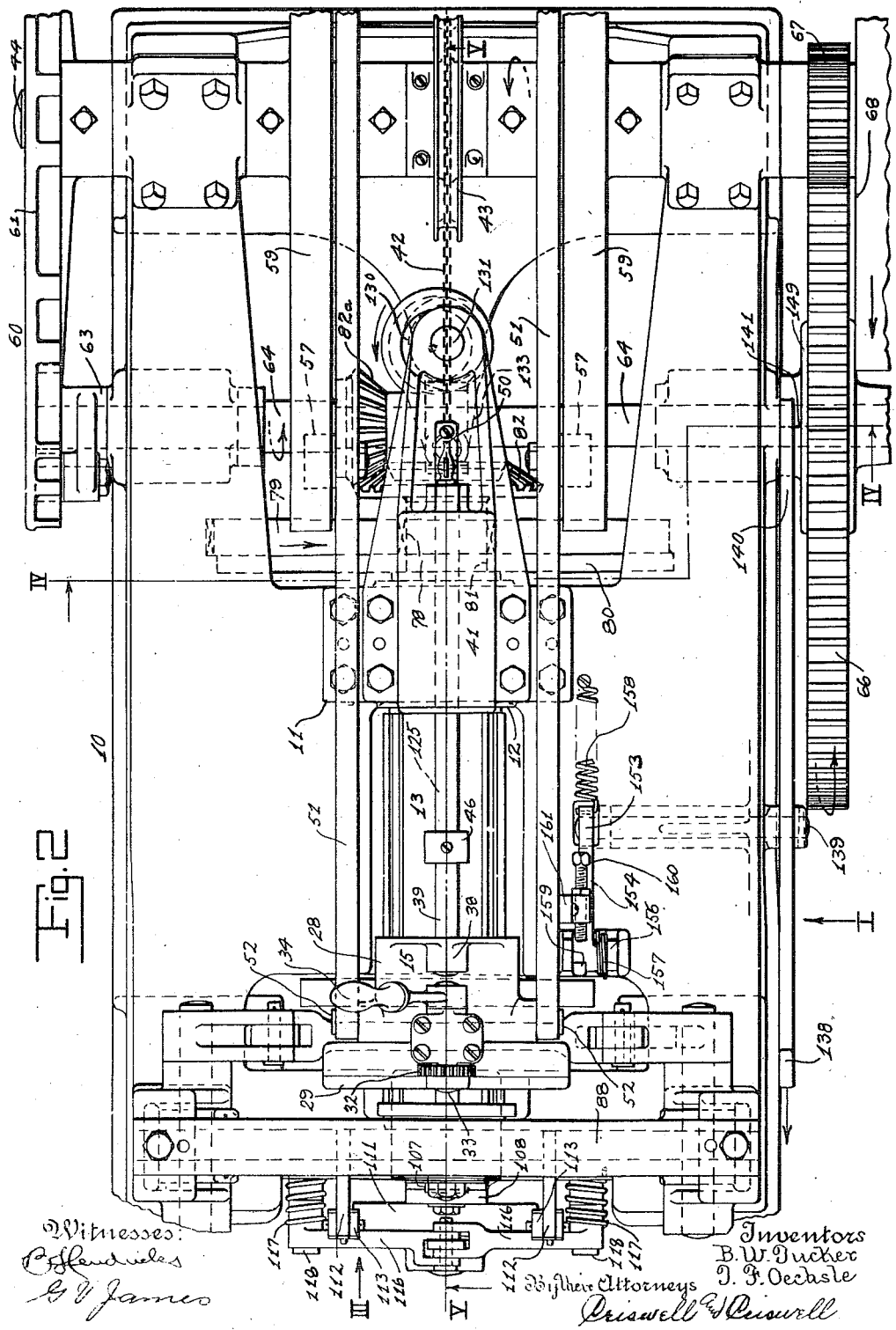

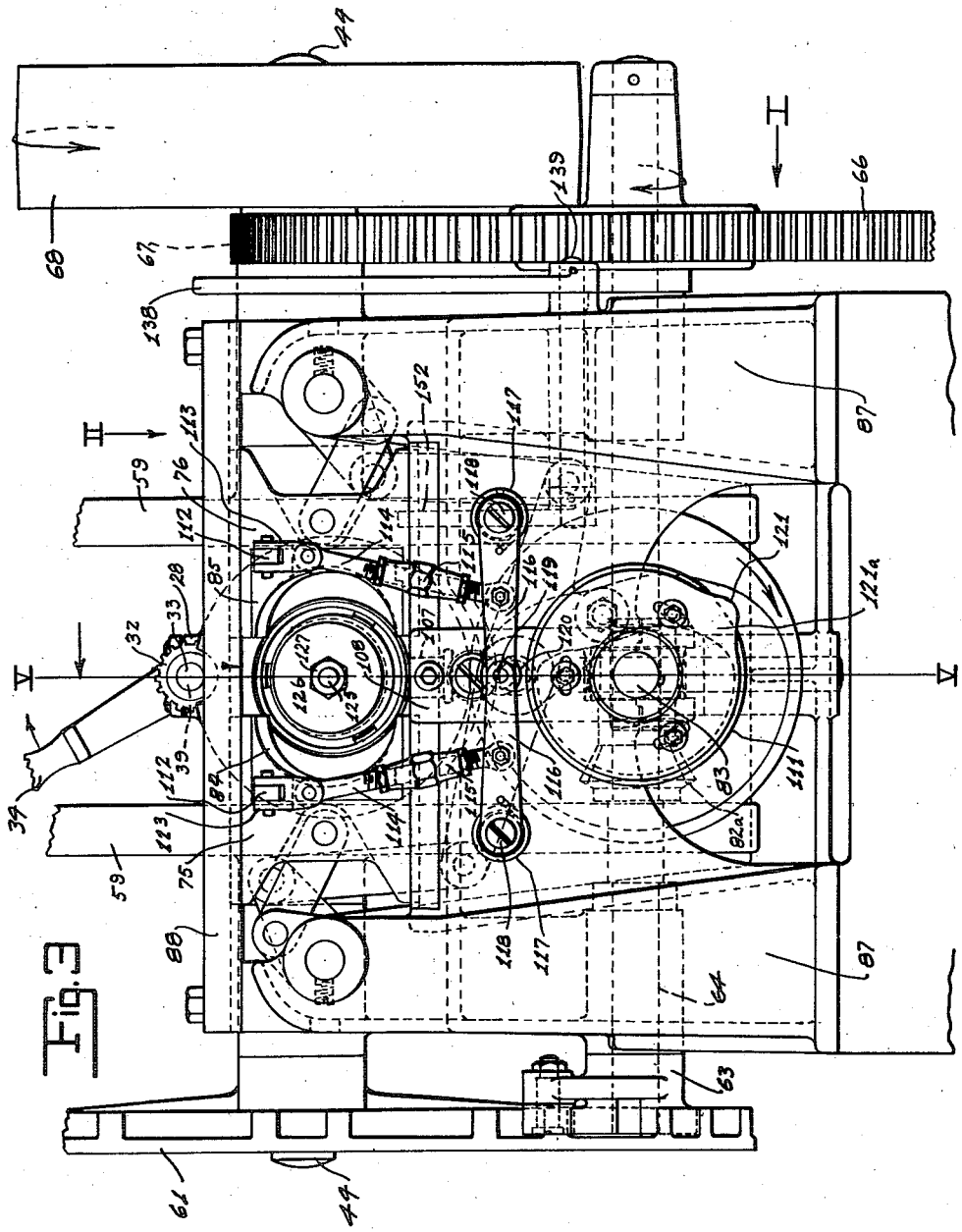

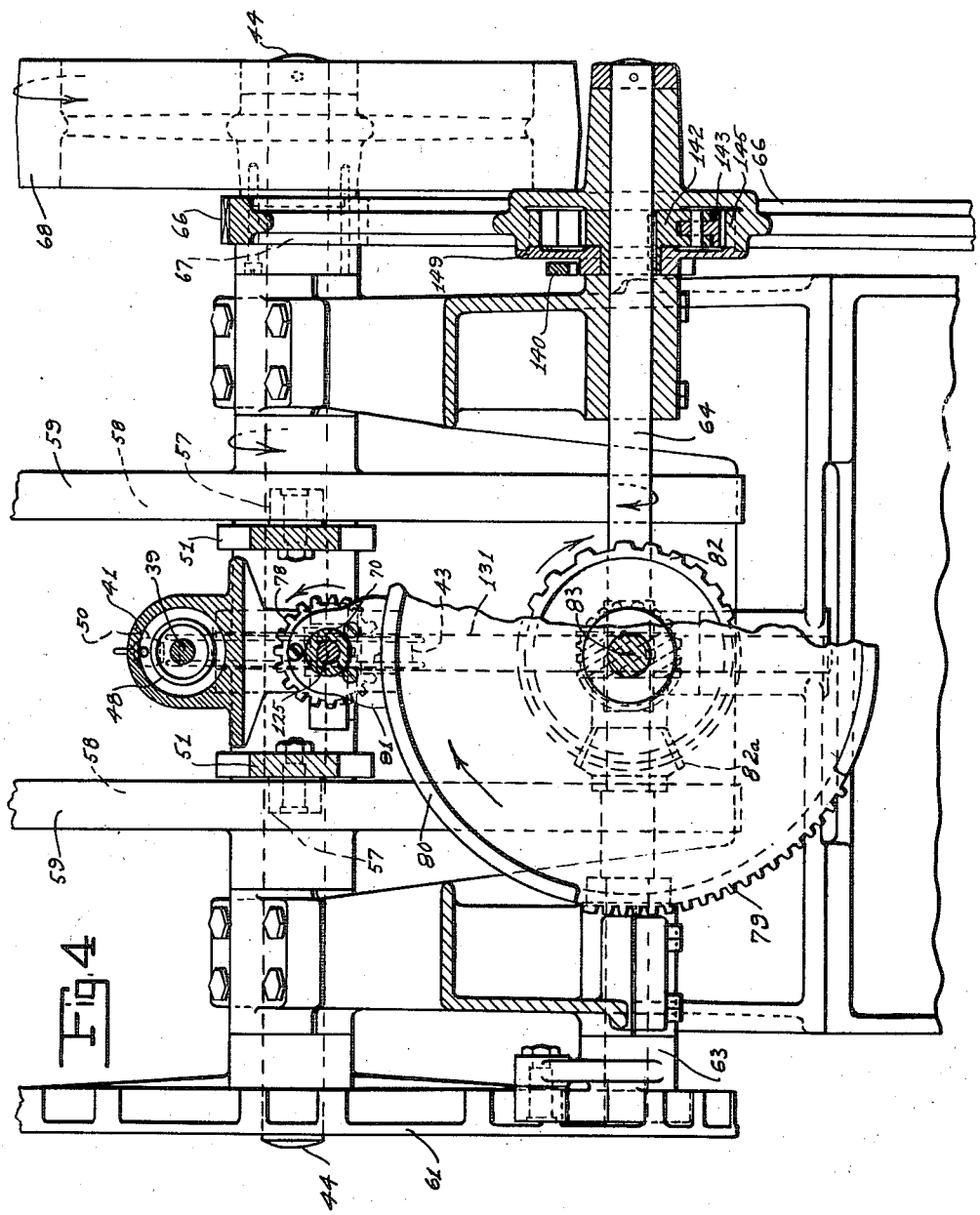

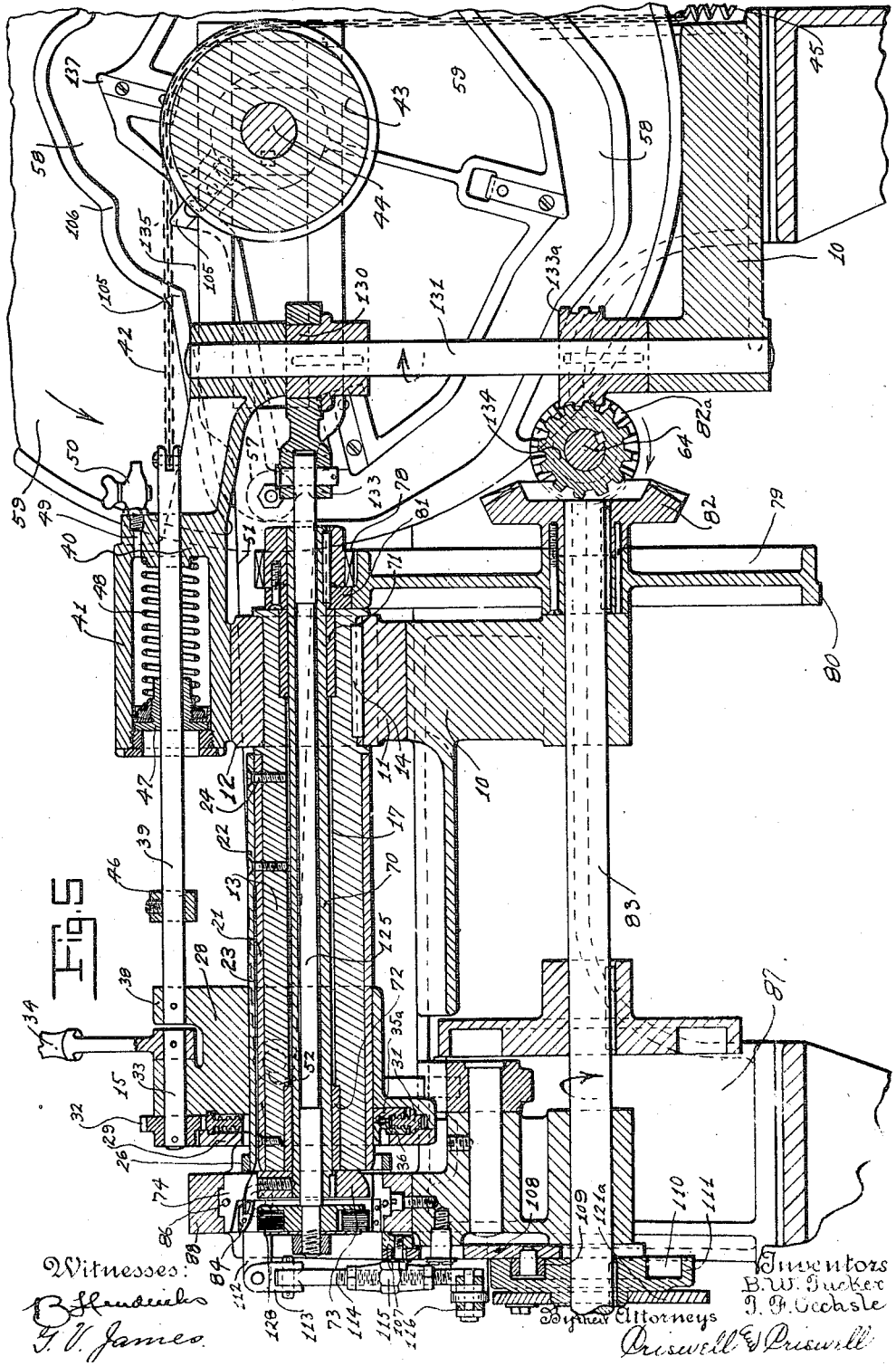

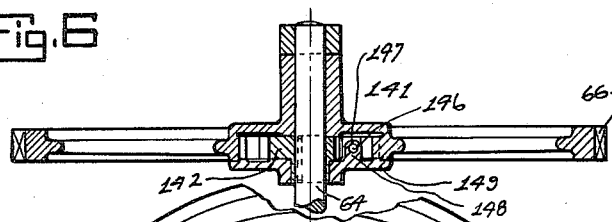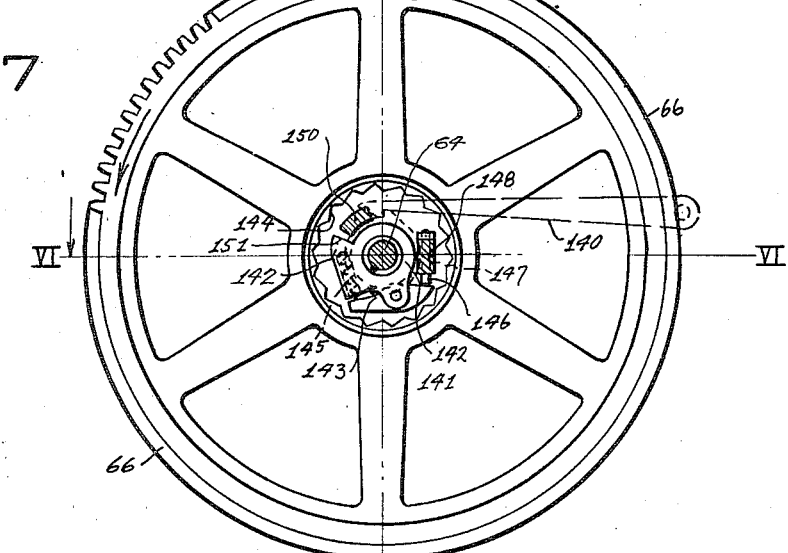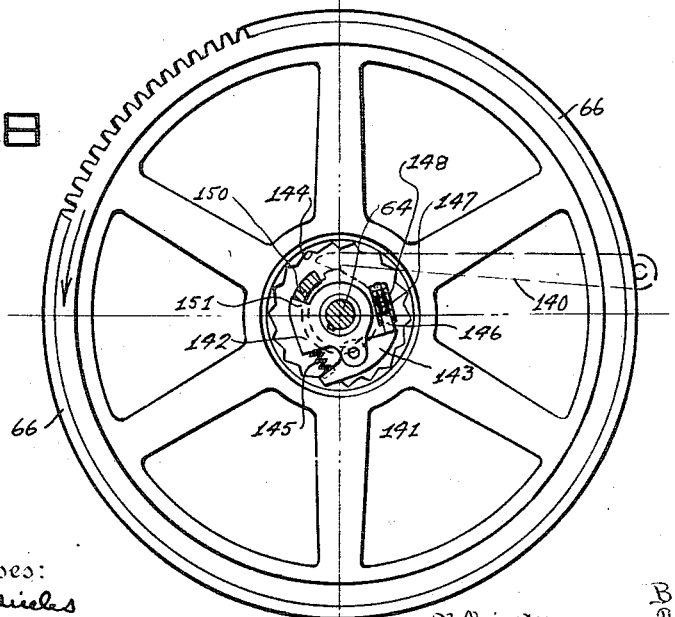

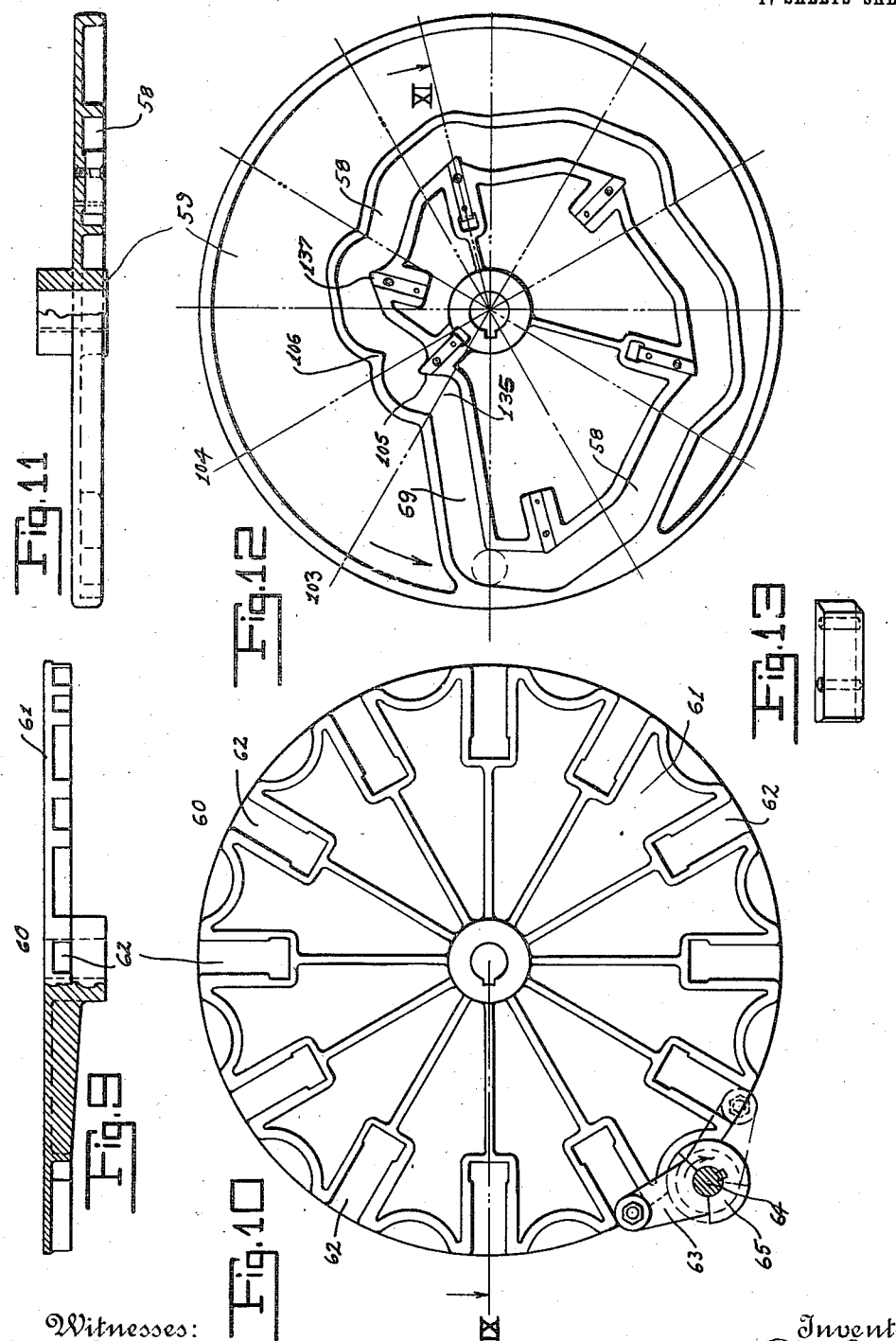

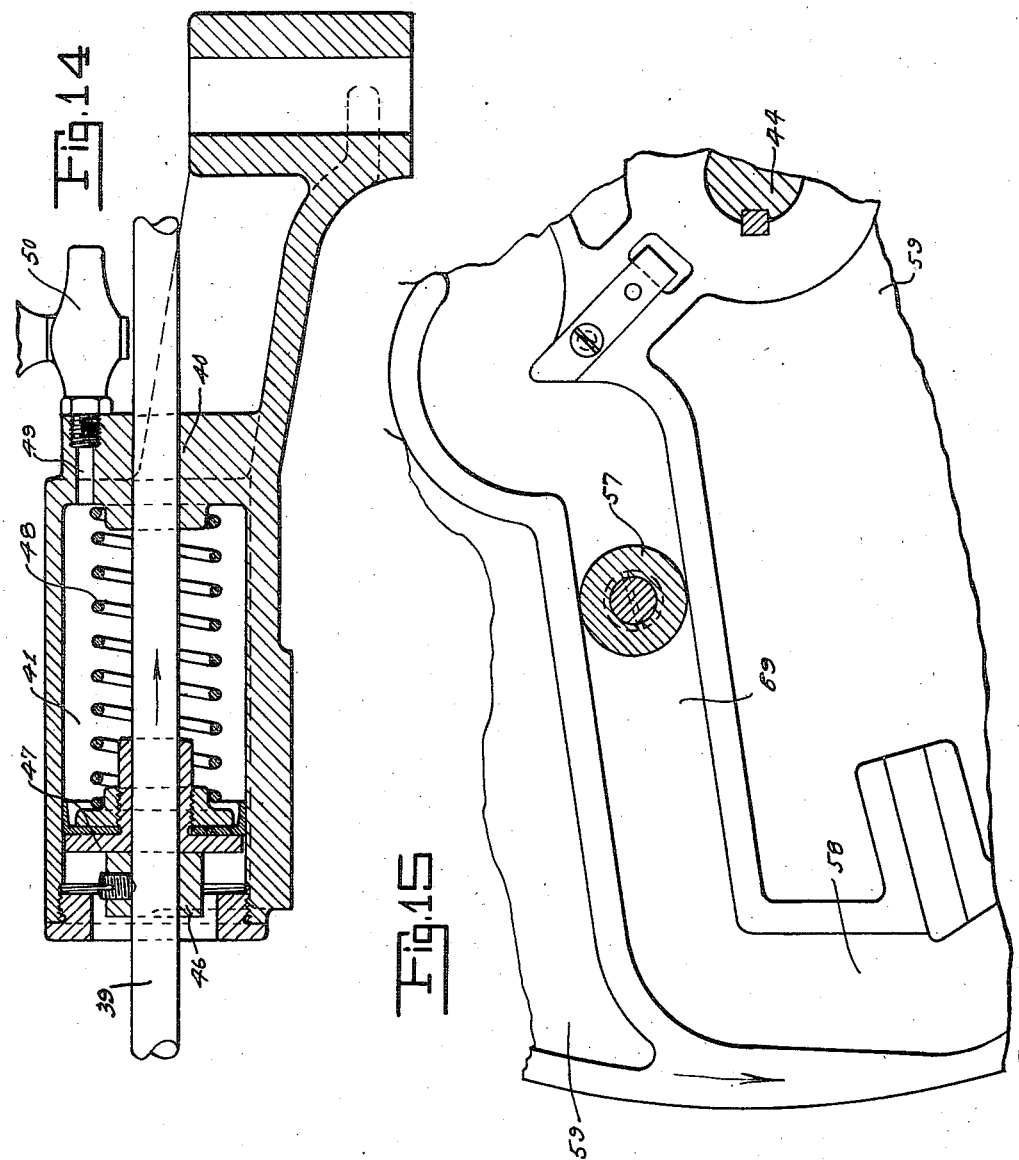

B. W. TUCKER & T. F. OECHSLE.
PIPE BENDING MACHINE.
APPLICATION FILED JULY 15, 1909.
979,724.
Patented Dec. 27, 1910.
17 SHEETS—SHEET 9.
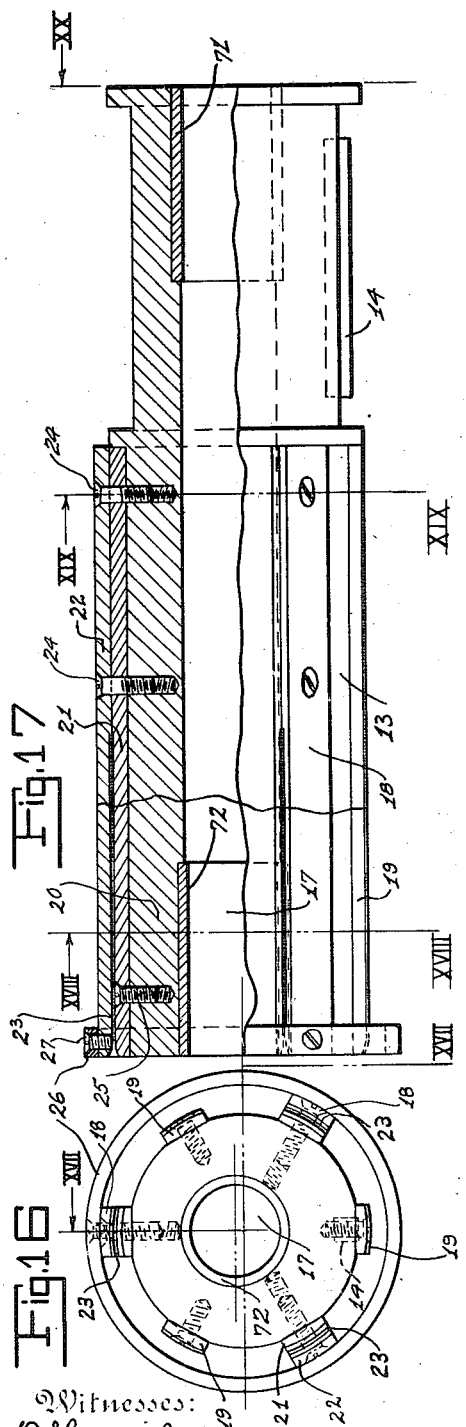
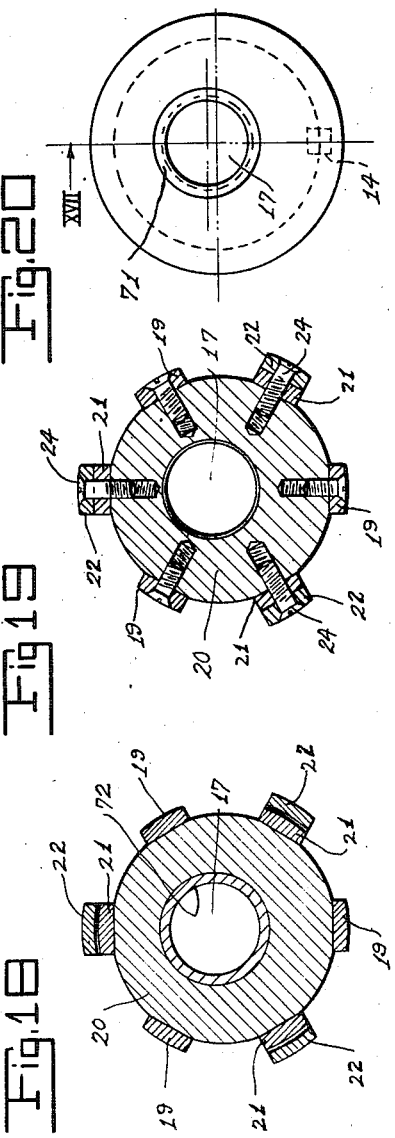
Witnesses:
B. Hendricks
G. V. James
Inventors
B. W. Tucker
T. F. Oechsle
By their Attorneys
Criswell & Criswell B. W. TUCKER & T. F. OECHSLE.
PIPE BENDING MACHINE.
APPLICATION FILED JULY 15, 1909

979,724.

Patented Dec. 27, 1910.

17 SHEETS—SHEET 10.

Witnesses:
Inventors
B. W. Tucker
T. F. Oechsle
By their Attorneys
Criswell & Criswell

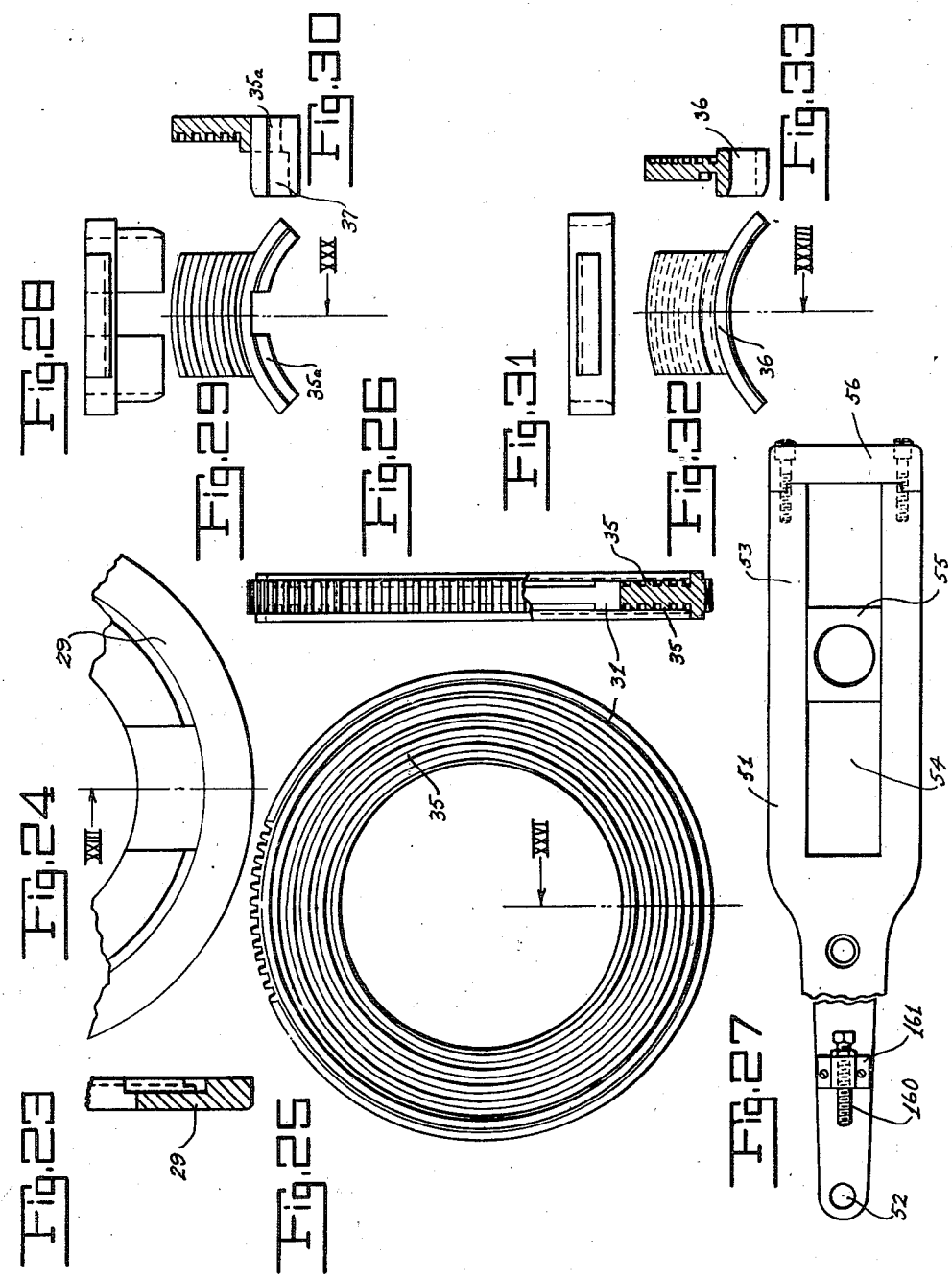

B. W. TUCKER & T. F. OECHSLE.
PIPE BENDING MACHINE.
APPLICATION FILED JULY 15, 1909
979,724.
Patented Dec. 27, 1910.
17 SHEETS—SHEET 12.
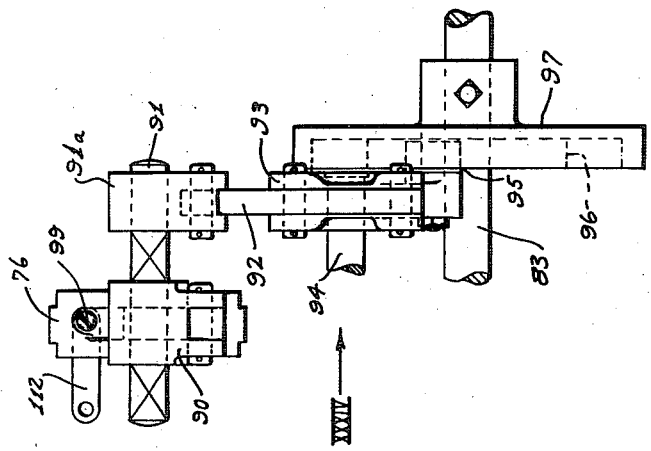
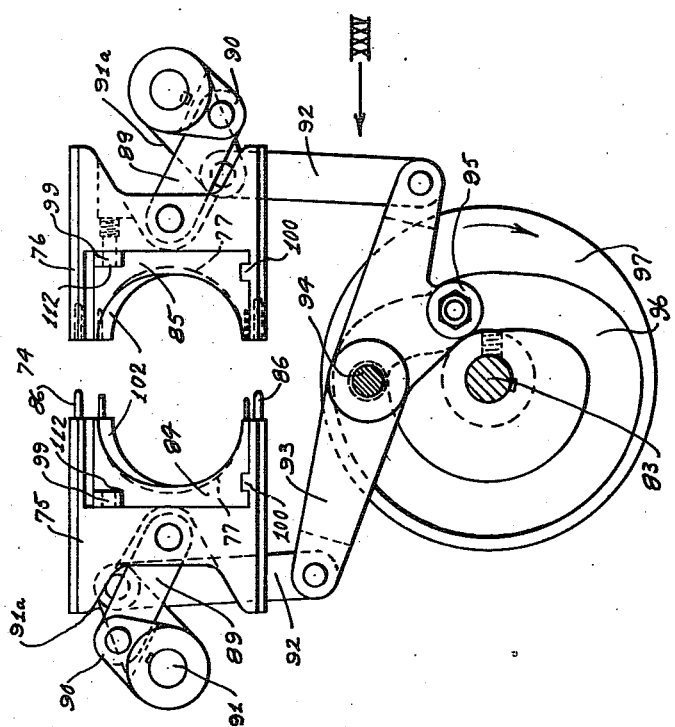
Witnesses:
Inventors
B. W. Tucker.
T. F. Oechsle.
By their Attorneys
Criswell & Criswell B. W. TUCKER & T. F. OECHSLE.
PIPE BENDING MACHINE.
APPLICATION FILED JULY 15, 1909
979,724.
Patented Dec. 27, 1910.
17 SHEETS—SHEET 13.
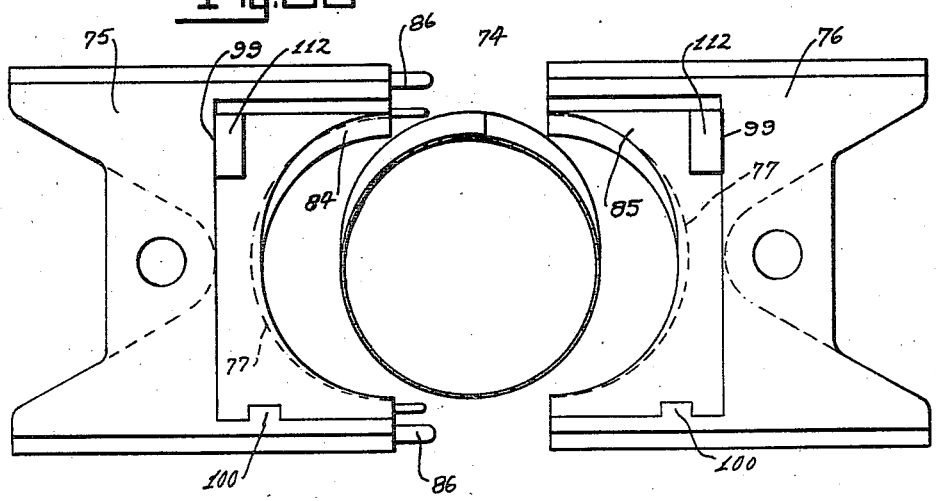
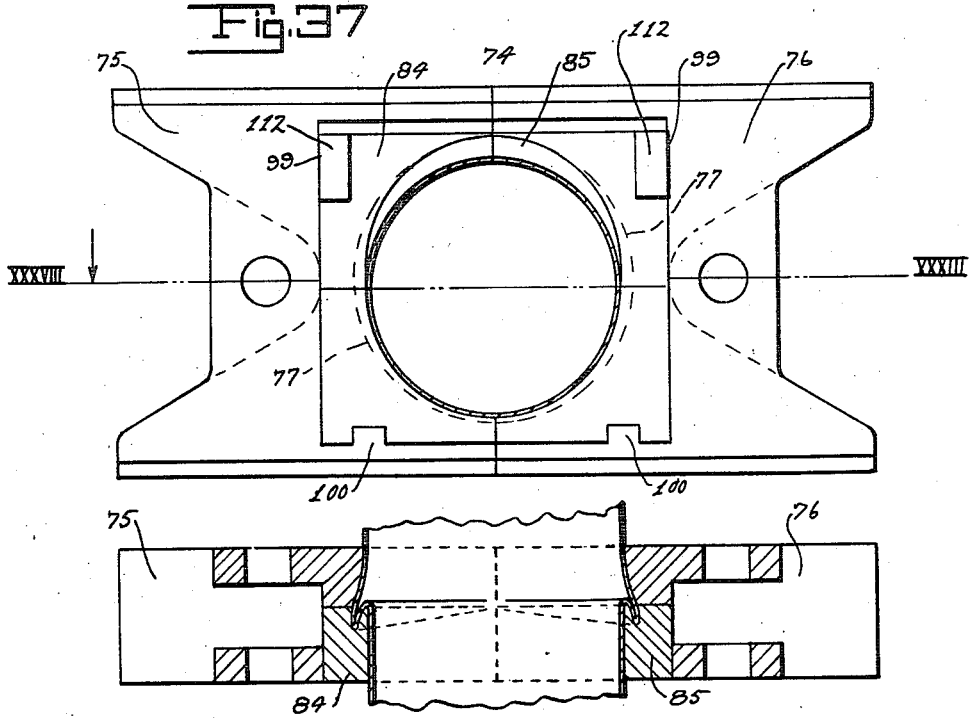

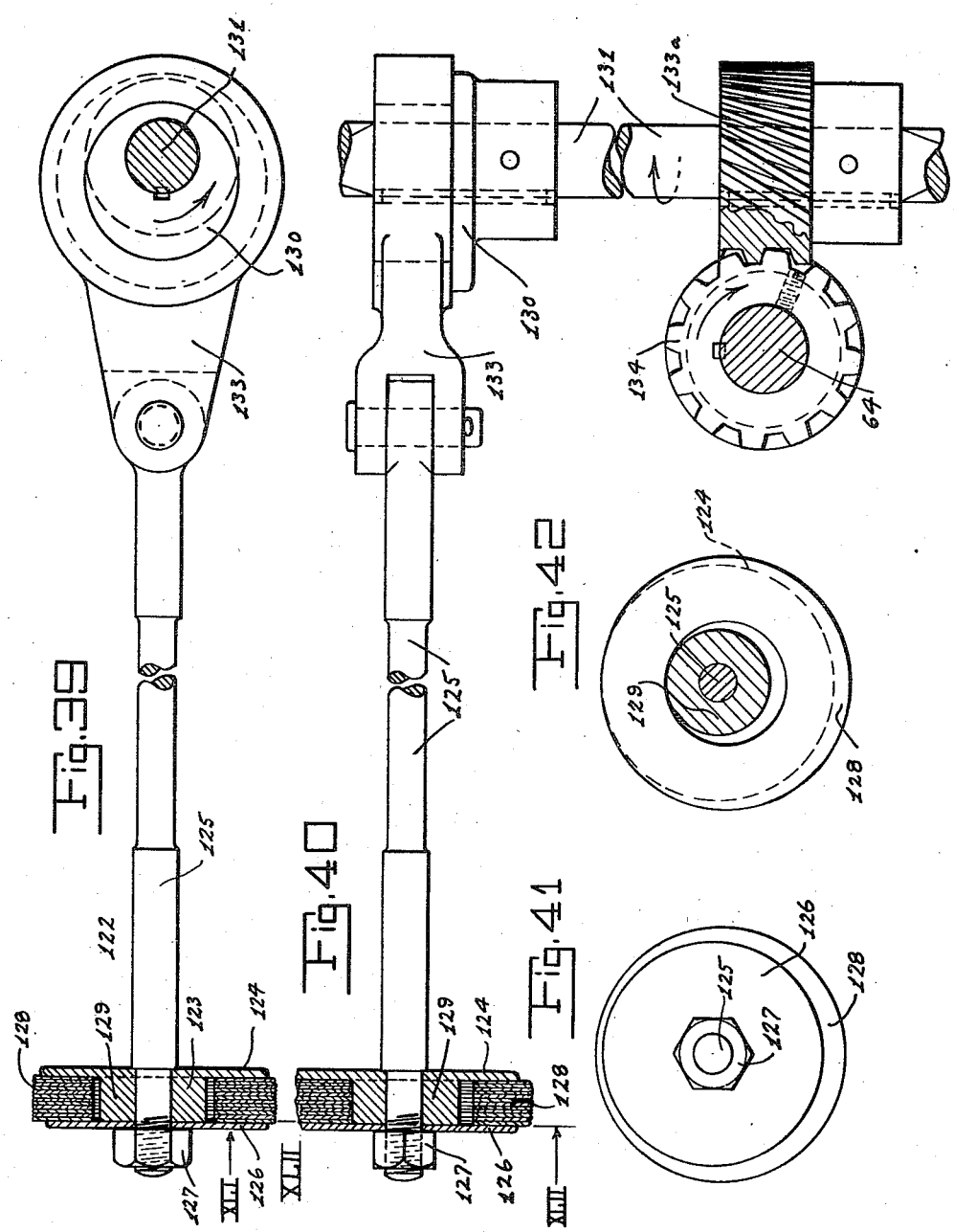

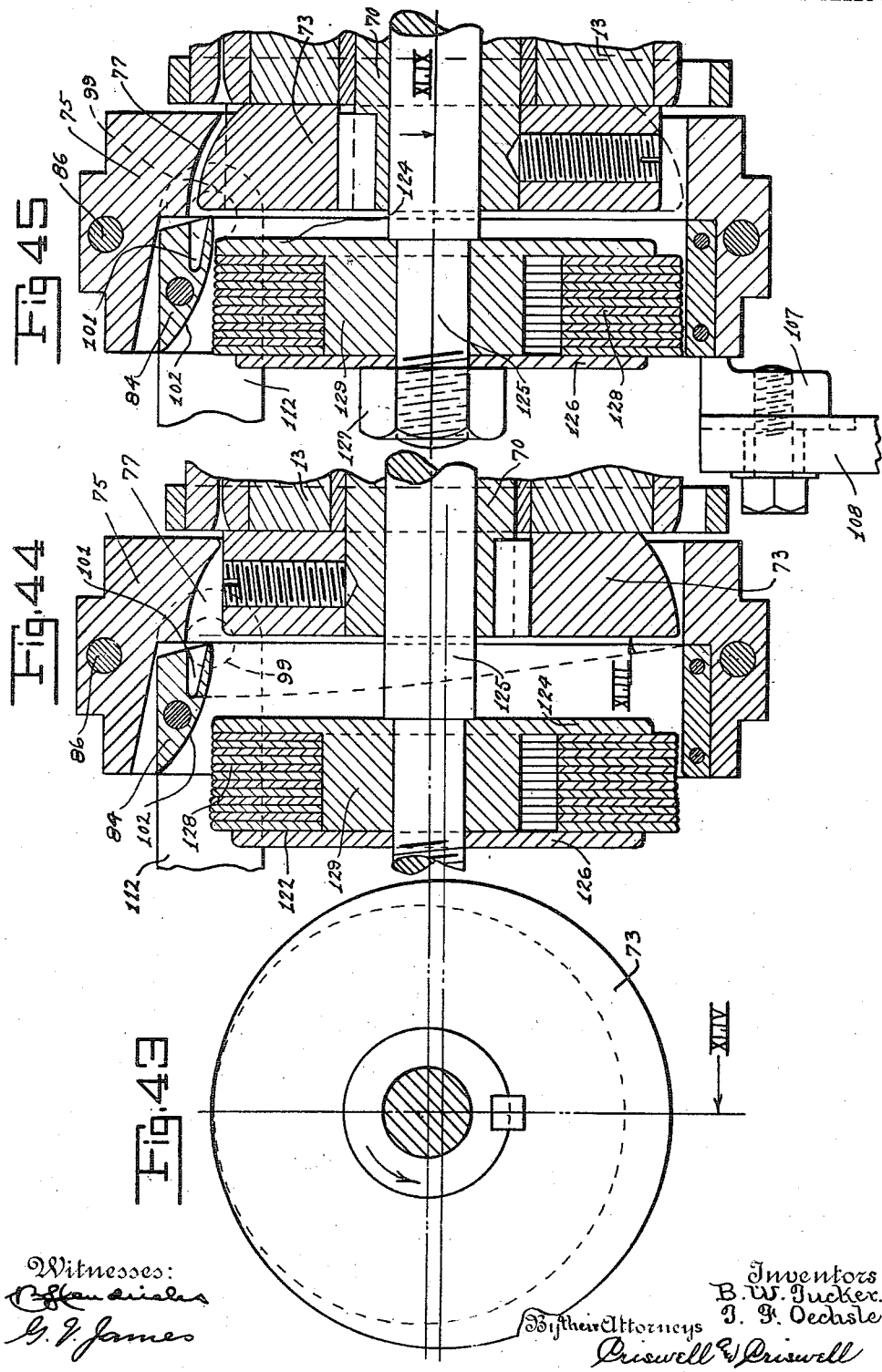

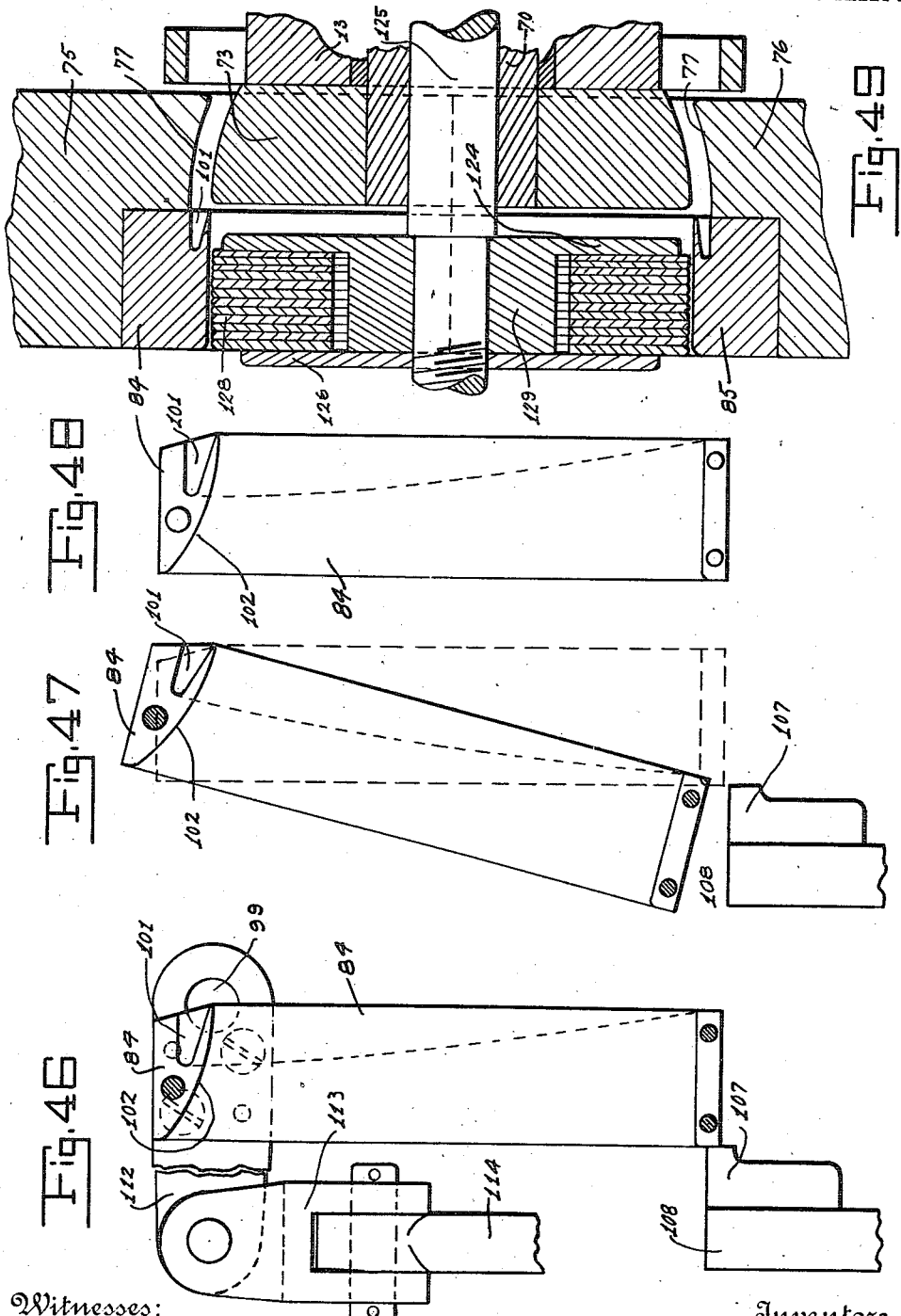

B. W. TUCKER & T. F. OECHSLE.
PIPE BENDING MACHINE.
APPLICATION FILED JULY 15, 1909.
979,724.
Patented Dec. 27, 1910.
17 SHEETS—SHEET 17.
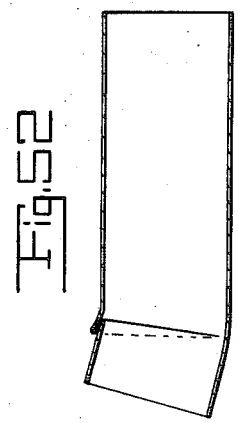
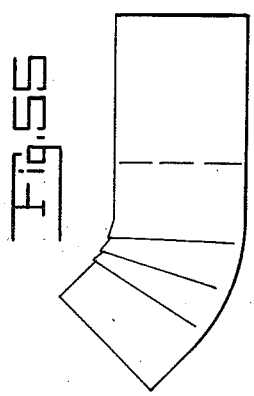
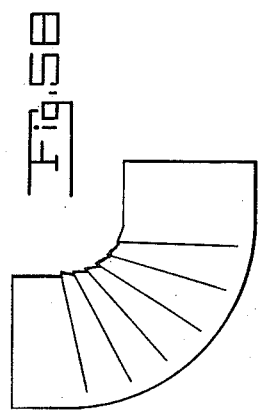
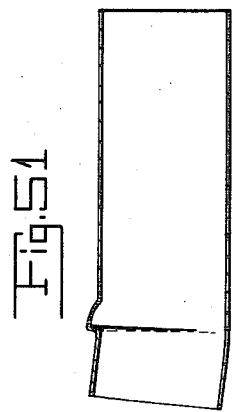
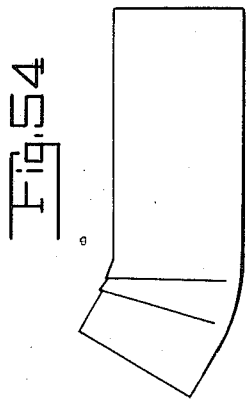
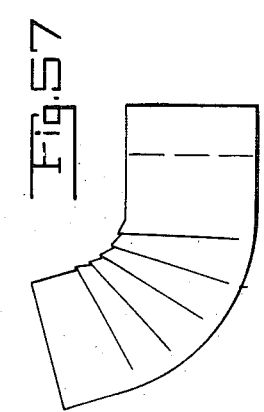
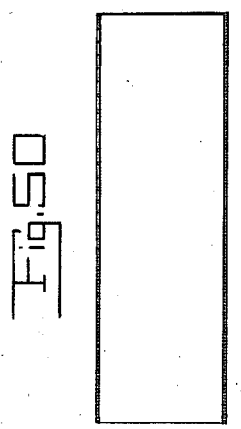
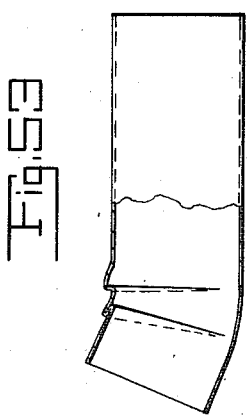
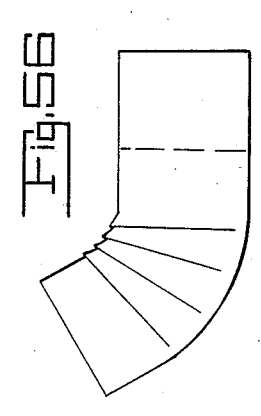

UNITED STATES PATENT OFFICE.

BENJAMIN W. TUCKER, OF SOUTH ORANGE, NEW JERSEY, AND THEODORE F. OECHSLE, OF PHILADELPHIA, PENNSYLVANIA.

PIPE-BENDING MACHINE.

979,724.

Specification of Letters Patent. Patented Dec. 27, 1910.

Application filed July 15, 1909. Serial No. 507,694.

*To all whom it may concern:*

Be it known that we, BENJAMIN W. TUCKER and THEODORE F. OECHSLE, citizens of the United States, and residents of South Orange, county of Essex, and State of New Jersey, and Philadelphia, county of Philadelphia, and State of Pennsylvania, respectively, have invented certain new and useful Improvements in Pipe-Bending Machines, of which the following is a full, clear, and exact description.

This invention relates more particularly to a machine for bending sheet metal to form elbows of any desired angle.

The primary object of the invention is to provide a simple and effective machine in which a tubular sheet metal body may be placed, and the said body formed with one or more crimps as a part thereof to adapt the body to be bent at an angle, and the said angle varied according to the number of crimps formed in the body.

Other objects of the invention are to provide simple means for effectively and positively gripping the tubular body or blank so as to properly move the same in the machine while the blank is being bent; to provide simple means for moving the gripping device or chuck; to provide a simple die to assist in forming the crimps; to provide simple means for initially forming a rib before the crimped part is caused to overlap the body portion of the pipe or elbow; to provide simple means for controlling and moving the members of the die; and to provide means whereby the elbow or pipe while being bent will be held so that its proper shape shall be retained.

A further object of the invention is to provide a machine which will be very rapid in its movement, and which will be entirely automatic after the blank in a tubular form is placed in the machine.

With these and other objects in view, the invention will be hereinafter more particularly described with reference to the accompanying drawings, which form a part of this specification, and will then be pointed out in the claims at the end of the description.

Figure 21:
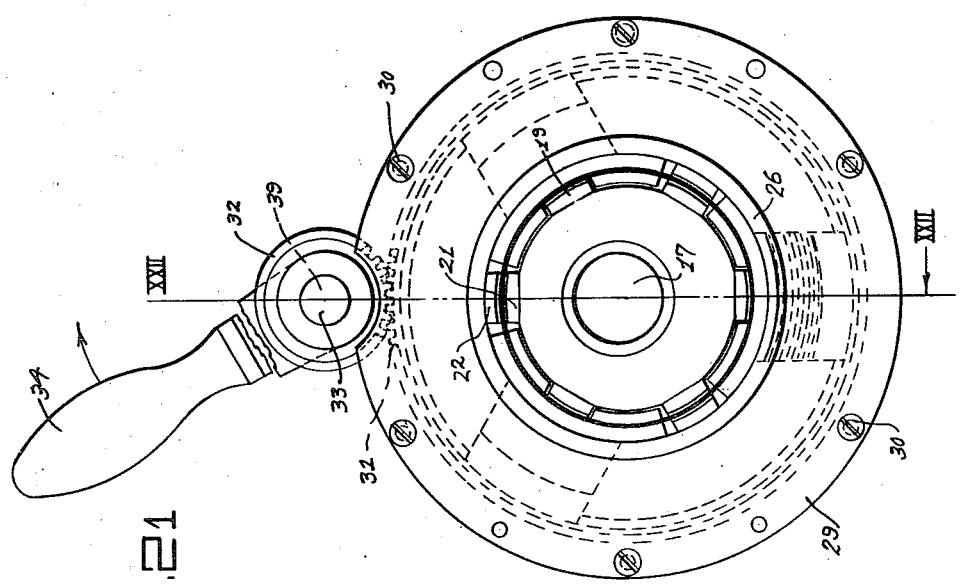

In the drawings, Figure 1 is a side elevation, partly broken away, of one form of machine embodying our invention. Fig. 2 is a plan view, showing a part of the front and rear of the machine broken away. Fig. 3 is a front elevation of the machine, showing parts thereof broken away. Fig. 4 is a transverse section, taken on the line IV—IV of Figs. 1 and 2. Fig. 5 is a longitudinal section, taken on the line V—V of Fig. 2. Figs. 6 to 8 are views showing one form of clutch for starting or stopping the machine. Fig. 9 is a plan view, partly in section, and Fig. 10 is a detail elevation of a part of the Geneva movement, respectively, employed in connection with operating the blank gripping device or chuck. Fig. 11 is a plan view, partly broken away, of one form of one of the cams for moving the blank or tube chuck and which cams are operated by the mechanism shown in Figs. 9 and 10. Fig. 12 is an elevation of one of the cams for operating the gripping chuck. Fig. 13 is a detail perspective view of one of the cam toes for moving the chuck while forming the crimps. Fig. 14 shows a part of the connection for operating the tube gripping chuck. Fig. 15 is an enlarged fragmentary section of the chuck operating cam. Fig. 16 is a front elevation of the sleeve or mandrel serving as a guiding means for the gripping chuck, and also to initially support and guide the tube to be bent. Fig. 17 is a detail view, partly broken away, of the mandrel on which the body to be crimped is initially placed. Fig. 18 is a sectional view, taken on the line XVIII—XVIII of Fig. 17. Fig. 19 is a transverse section, taken on the line XIX—XIX of Fig. 17. Fig. 20 is a rear elevation of the mandrel. Fig. 21 is a front elevation of the chuck and the mandrel, showing how the gripping chuck is adapted to be made to engage and properly hold the pipe to be crimped. Fig. 22 is a longitudinal section, taken on the line XXII—XXII of Fig. 21. Figs. 23 to 26 are certain details of the chuck. Fig. 27 is a part of the operating mechanism of the chuck. Figs. 28 to 33 are other detail views of parts of the chuck. Fig. 34 is a detail front elevation, partly in section, showing the means for moving the dies. Fig. 35 is a side elevation of the mechanism shown in Fig. 34. Fig. 36 is an enlarged view of the dies, showing the same in an open position, and with the tube ready to be forced forward. Fig. 37 shows the die in a closed position when the crimp is rolled and the tube advanced to force the crimp into the die also to press down the previous crimp. Fig. 38 shows how the tube is forced forward to make the first crimp and to cause the rolled rib to overlap the body of the tube. Fig. 39 is a plan view, partly in section, of the former or wiper which moves within the tubular blank. Fig. 40 is an elevation, partly broken away and partly in section, of the device shown in Fig. 39. Fig. 41 is an end elevation of the head of the device or wiper shown in Figs. 39 and 40. Fig. 42 is a section taken on the line XLII—XLII of Fig. 40. Fig. 43 is an enlarged end elevation of the wiper. Fig. 44 is an enlarged section of the die, wiper and rolling device, showing the wiper moving outward at the start of the machine. Fig. 45 is a view similar to Fig. 44 except that the parts are in a different position. Fig. 46 is a detail view of one of the die members in position to receive the initial rib to complete the crimp. Fig. 47 shows how the inner pivoted die members may swing outward to conform to the movement of the tube or blank while being bent. Fig. 48 shows the inner pivoted die members in their normal position but the die opened to allow for the feed of the tube forward for next crimp. Fig. 49 is a sectional plan view, taken on the line XLIX—XLIX of Fig. 45. Figs. 50 to 58 show the various steps in forming an elbow, the angle of which is varied according to the number of crimps.

The invention is shown as particularly adapted for bending tubes or pipes of sheet metal adapted for use in connection with building or other purposes, and the said bending is effected by forming one or more crimps in the metal according to the angle to which the metal is to be bent, such as when forming elbows, and while the invention is shown as constructed in a particular way to form the crimps and bend the tubular blank, certain features of the machine and the construction thereof may be changed according to the requirements of the particular article to be manufactured.

The frame 10 may be of any suitable construction and intermediate the front and rear thereof is an extended bearing 11 having a cap 12 secured thereto by bolts or otherwise, and held in said bearing is a tubular sleeve, device or mandrel 13 which is held by a key 14 or otherwise in the bearing 11 against rotation. The bearing is long enough to give a proper support to the mandrel 13, and this mandrel extends forward so as to overhang the forward portion of the machine, and slidingly held on said mandrel 13 is a chuck or gripping device 15. This chuck 15 may be of any suitable construction and may be made to hold and grip the tube in any desired way, and said chuck is adapted to hold the tube or blank at its end and to move the same properly throughout the formation of the crimps and the bending of the tubes. The tube or blank of the desired length is passed inward so that the mandrel 13 will properly support the same until the inner edge of the tube or blank rests against the face or side of one of the chuck jaws, as 16 Fig. 22. The mandrel 13, Figs. 5 and 16 to 20, is constructed to guide and support the tube and has an opening 17 therethrough to make the same tubular and is provided with spaced supporting bars 18 and 19. There are three bars 19 which are adapted to engage the inner surface of the blank and there are three guiding bars 18 spaced about the periphery of the body portion 20 of the mandrel, and these bars 18 comprise two members 21 and 22 which are slotted or separated by a space, as 23, for the blank to fit therein according to the length of the blank. The bars 18 are held to the mandrel at the rear by the screws or bolts 24, and the inner members 21 are secured to the body 20 at the outer end by a screw 25 while the outer members or bars 22 are each connected and supported at their outer ends by a ring or annular member 26 which is secured to the bars by means of screws 27 or otherwise. The blank will thus be properly supported in order to hold it in its proper shape during the bending and crimping operation.

The chuck 15 is substantially the same in construction as that of the ordinary form of three-jawed universal chuck, except that the said chuck has each jaw formed of two opposed gripping members which are operated in such a way as to cause the same to move toward each other and thereby grip the blank positively and without liability of the same slipping. As shown the chuck, Figs. 21 to 33, comprises a head or casing 28, and this head is slidingly held on the mandrel 13. The head 28 is provided with a cap plate or member 29 which is secured thereto by screws 30 or otherwise, and in said cap and head is an annular groove in which is adapted to move a rotary element 31. The head 28 has a flange to which the cap plate 29 is secured to provide a space for the rotary element 31, and this element has ribs which are guided in opposed annular grooves in the flange and cap plate of the head so as to be rotatable therein, and said rotary element 31 has teeth on the outer surface thereof for a part of its periphery which is adapted to be engaged by the teeth of a pinion 32 secured to the shaft 33, the latter being held to rock in the head 28 and on the end of the shaft is an operating handle 34 by which the element 31 may be rotated. The element 31 has a spiral tooth or teeth 35 on its opposite faces and these teeth are adapted to engage spiral teeth in the jaws 35ª and 36. There are a plurality of these jaws, in this case three, and the jaws are arranged in sets, the jaws of one set, as 36, being adapted to fit on the outside of the blank, and the jaws 35ª of the other set being adapted to engage the inside portion, the latter jaws being provided with an angular part, as 37, so that when the element 31 is rotated by the movement of the handle 34, the two sets of jaws will be forced toward each other to grip the tubular blank. The jaws are suitably guided in the head to move radially and the outer jaws are spaced far enough apart to not interfere with the supporting bars or members of the mandrel 13, and the inner jaws are cut away substantially centrally thereof to fit about the supporting bars or members 19 of the mandrel.

The head 28 is provided with a lug 38, and this lug 38 has a rod 39 secured thereto at one end. The rod 39 is guided in the end 40 of a cylinder 41, and is connected to a chain 42 which passes about a pulley 43 located on a shaft 44, and this chain may be secured at one end to a spring 45, the said spring tending normally to force the chuck 15 rearwardly along the mandrel 13. A collar 46 is secured to the rod 39 and this collar is adapted to engage a plunger 47 which is movably held in the cylinder 41 and is normally forced in one direction by means of a spring 48, the latter being of sufficient tension to restore the plunger or piston 47 to its former position. The piston 47 may fit substantially tight within the cylinder 41 and in the cylinder at one end thereof is an opening 49 which is controlled by the petcock 50, and this petcock may be open to any desired extent to control the degree with which the air from the cylinder 41 may be forced therethrough. As will be seen when the spring 45 forces the chuck 15 rearwardly, the plunger 47 will take the impact of the collar 46, and by reason of the air within the cylinder 41, will cushion the backward movement of the chuck and the tube carried thereby.

A yoke or rod 51 is pivotally held at 52 to each side of the chuck 15 and this yoke, Figs. 1, 2, 5 and 27, has an enlarged end 53 which is slotted, as at 54, and in this slotted end is a bearing 55 which is adapted to fit about a shaft 44 serving to guide the yokes or rods 51 during the movement of the chuck 15, and the bifurcated end formed by the slot 54 may be closed by a cap-piece 56. Each yoke or rod 51 carries a trundle 57 which is adapted to move in cam grooves 58 of cams 59 which are held to rotate with the shaft 44. These cams 59 serve to position the tubular blank during the crimping operation and also serve to force the metal in the die to telescope or force a part of the metal over the body of the tube, and said cams are rotated through a Geneva movement 60, Figs. 2, 9 to 13. This Geneva movement has a wheel member 61 secured to the cam shaft 44, and said wheel member or element 61 has radially slotted portions 62 which are adapted to be engaged by a trundle carried by an arm 63 as is usual with movements of this character, and said arm 63 is secured to a shaft 64 which also carries a locking element 65 to engage recessed portions in the element 61 serving to lock and hold the wheel 61 stationary when the latter is not to be moved by the arm 63. The shaft 64 serves as the main drive shaft and on one end of said shaft is a gear 66 which is in mesh with a smaller gear 67 movable independently of the cam shaft 44, and adapted to rotate the gear 67 is a pulley 68 whereby the cams may be positively driven with a step-by-step movement as the pulley is operated. As the cams are rotated, the parts 69 of the cam grooves are brought in line with the trundles or rollers carried by the rods 51 for operating the chuck, and this will permit the spring or springs 45 to force the chuck quickly rearward, and this places the blank about the mandrel in position to receive the first roll or bulged part to form the initial rib or part of the first crimp. This bulging of the tube may be effected in any desired way. As shown a tubular spindle 70, Fig. 5, is rotatably held in the mandrel 13, and this spindle is eccentrically arranged with respect to the center of said mandrel and is suitably supported in the mandrel by the bushings 71 and 72 located at the ends of said mandrel. A rotary device or spreader 73 is rigidly held to the spindle or shaft 70 at the forward part thereof by means of a set screw or otherwise, and is adapted, when rotated, to force a part of the metal outward into the die 74 to form a rib thereon corresponding to the shape of said device, and held in the path of movement of the device 73 is a die 74.

The die 74, Figs. 5, 34 to 38, and 44 and 45, comprises two laterally movable parts or outer members 75 and 76 which are provided with a cut away portion, as 77, corresponding to the rib or bulged portion when the latter is rolled by the rotary movement of the device 73, as shown best in Fig. 51, and after the device has been moved from the position shown in Fig. 44 to that shown in Fig. 45. The outer end of the spindle 70 is provided with a pinion 78, and this pinion is adapted to be rotated by a segmental gear 79 forming an element of a modified form of Geneva movement, and this wheel has a locking rib or part 80 which is adapted to engage a wheel or disk 81 located adjacent to the pinion 78 and attached thereto so that the spindle 70 may be given a single rotation and then locked for the rest of the movement of the segmental gear, as is common in such movements. The gear 79 is held to rotate with a bevel gear 82 secured to a shaft 83 which is adapted to rotate once for each crimp, and this gear 82 is in mesh with a gear 82ª secured to the main drive shaft 64 so that each movement of the shaft 83 will rotate the spindle 70, and by reason of its eccentric action and rotary movement of the device 73 will force the metal outward to form the enlarged part or rib in the tube for the first crimp. The tube after the same is moved backward to form the first rib is suitably held about the body thereof by the members 75 and 76 of the die head but only after the tube is at rest, and pivotally held in the outer die members 75 and 76 are the die members 84 and 85, the latter being secured to the die member 76 and the former to the die member 75. The member 75 of the die has suitable dowel pins 86 which are adapted to fit in openings in the member 76 to properly aline the two members, and these members are adapted to move laterally and horizontally on the frame, the latter being provided with upwardly-extending brackets or a head 87 at the forward part of the machine forming a part of the frame over the top of which is a guiding plate or cap bar 88. The bracket or head 87 as well as the cap bar or plate 88 have grooves along the same, and these grooves are engaged by the ribs formed as a part of the members 75 and 76 of the die. These die members 75 and 76 are moved laterally with relation to each other by suitable mechanism which is best shown in Figs. 34 and 35. A link 89 is connected to each of the slidable die members 75 and 76, and one end of the link is connected to a crank or arm 90 which is held to a rock shaft 91. These shafts 91 are held to rock in the frame head 87, and on each shaft is a crank arm 91ª which is connected by a link 92 to a lever 93. This lever 93 is pivotally held at 94 to the frame head 87, and the links 92 are connected to the opposed ends of said lever so that when the lever is rocked on its pivot, it will throw the die members 75 and 76 toward or from each other according to its direction of movement. The lever 93 is pivoted at 94 and carries a trundle 95 and this trundle is movable in a cam groove 96 of a cam 97, the latter being secured to the longitudinally-extending shaft 83 so that by movement of the shaft 83, the cam 97 will rock the lever 93 and through it operate the die members 75 and 76. The links 89 and arms 90 form substantially a toggle joint so that die members will be rigidly held in their closed position.

Each of the members 75 and 76 has a pivotally held member as already explained. These inner die members 84 and 85 are intended to have the rib formed by the device 73 forced therein to cause the metal to telescope and overlap the body of the material, as shown in Fig. 52. These die members 84 and 85 are each pivoted, as at 99, Figs. 34 to 37, to swing outward at the lower end and are each provided with a slot in which is adapted to fit a rib 100 arranged on the outer members 75 and 76. The pivotal inner die members are each provided with a groove, as 101, Figs. 46 and 47, which corresponds to the shape and length of the overlapping portion or crimp part of the tube and has the inner surface thereof curved, as at 102, to permit the tubular blank or pipe to bend while forming the crimp, and said groove 101 of each of the inner die members is largest at the upper portion thereof and gradually tapers into nothing, and is for the purpose of taking care of the surplus material caused by the crimps to permit the pipe to be bent. One of the pivotal die members, as 84, has one or more dowel pins which are adapted to fit into openings in the opposed member 85 to properly aline the two members, and the inner surface of said die members is made to correspond to the diameter of the blank or tube, and when the inner die members are in the position shown in Figs. 46 and 48, the chuck 15 will be forced forward by the rotary movement of the cams 59 through the action of the Geneva movement already explained which will move the said cams from the point 103, Fig. 12, to the point 104. This action will cause the toes 105 of the cams 59 and part 106 of said cams to cause the trundles 57 and the yoke connected to the chuck 15 to force the said chuck forward and backward in order that the metal previously rolled into a rib, may be quickly forced into the grooves 101 of the die members 84 and 85 and withdrawn therefrom, thus completing the first crimp or telescoping of the metal. There are a plurality of toes 105 and parts 106 corresponding in number and position to the number and position of crimps to be made, and the grooves 58 are of a spiral form to place the chuck at the starting position when the last crimp has been made.

At the time that the chuck is forced forward to complete the crimp, the pivotally held inner die members 84 and 85 will move outward to allow the pipe to bend, but such outward movement of the said die members is retarded for a time until the tube and rolled part of the metal is moved far enough to partly define the overlapping or telescopic effect to form the crimp. To effect this latter feature and before the pivotally held members of the die are positively moved outward, as will be presently explained, during the forcing of the tube forward to cause the crimp, a holding device or toe 107, Figs. 2, 5 and 45, is provided which is adapted to be moved into the path of the inner pivotally held die members, and this toe or holder is held to a vertically movable bar 108 which is suitably guided on the frame head 87. The bar 108 is provided with a trundle or roll 109 which is adapted to move in a groove 110 of a cam 111 held to the shaft 83, the said cam being adapted to move and hold the toe in advance of the inner die members when forcing the metal or surplus material into the groove or slot portion 101 of said inner die members and just long enough to permit the telescoping or collapsing of the rib or rolled portion to be partly defined.

Each inner die member, as previously stated, is pivotally held to one of the outer die members and projecting from the point of pivot 99 are arms 112, Figs. 1, 3 and 5, and these arms are pivotally held to the links 113 and to each link is connected a rod 114 which may be adjusted by means of a turn buckle 115 or otherwise, one end of each rod being connected to a pivotally held arm 116. These arms 116 are normally forced upward by spring 117 located around the pivoting point 118 of said arms, and these arms are pivoted together substantially centrally of the machine, as at 119, and carry a roll 120 which is adapted to be engaged at the proper time by a cam point 121 forming a part of the cam 121$^a$ adjustably held to the cam 111, so that at the proper time the cam surface 121 will engage the roll and force the inner split die members outward to compensate for the curvature of the pipe as the same is being bent. It will be seen that when the members of the die are moved laterally as shown in Fig. 3 to an open position, the connecting rods 114 will be placed at an angle and will thereby raise the roll 120 out of the path of the cam and engaging portion 121, but when the dies are moved to a closed position, this will cause the roll to be lowered in the path of the cam engaging part 121 and will thereby positively force the inner die members outward after the toe or holder 107 has been removed from engagement therewith.

It is important that the diameter of the elbow remain uniform during the bending and forming of the crimps, and this is assisted by the wiper or device 122, Figs. 39 to 45, and this device 122 is in the form of a plunger and comprises a part or head 123 having a flange 124, and said head is held to a reciprocatory and longitudinally-movable rod 125. Fitting over the end of the rod is a plate 126 which is held to form a part of the head 123 by the nut 127 so that a space is provided between the plate 126 and the flange 124 to hold a plurality of washers 128 which substantially correspond to the inner diameter of the tubular blank. These washers have an opening larger than the diameter of the hub portion 129 and are adapted to move independently and freely around the hub portion 129 to adapt the same to conform to the curvature of the pipe or tube, and is intended also to serve as a supporting means for the body of the blank when the die members are moved laterally to engage the body between the same and to force the telescoped part or crimp in close contact with the body portion as the said dies are closed. This washer plunger, while the die members are being closed, is given a movement forward and is moved back again by the time the chuck is forced forward to complete crimp and thereby serves to keep tube true and prevent any inward collapse of the body. This back and forth movement to the wiper or plunger device 122 is effected by an eccentric 130 secured to the vertically arranged shaft 131. The rod 125 is enlarged at its ends so as to be properly guided in the tubular spindle 70, and its inner end is connected to the eccentric strap 133 which is operated by the eccentric 130 as the latter is rotated by the shaft 131, and on the shaft 131 is a spiral gear 133$^a$ which is in mesh with another spiral gear 134 held to the main drive shaft 64, and the said gears are so proportioned that one revolution will be given to the shaft 131 to two revolutions of the shaft 64, the said shaft 131 being suitably supported to rotate in the frame 10.

The operation of the parts thus far described will be readily understood from the foregoing description when taken in connection with the accompanying drawings. The tube in the form shown in Fig. 50 is placed in the machine around the mandrel 13 and has its end held by the gripping chuck or device 15 as already explained, and the main drive shaft 64 is then operated by starting the machine which will give a rotary movement to the arm 63 and thereby move the wheel 61 of the Geneva movement 60 so as to impart a partial rotation to the crimp cams 59 through the shaft 44. This will place the trundles 57 in line with the part 69 of the grooves of the cams 59 so that the spring 45 will cause the rod 39 connected to the chuck 15 to be forced rearward until the trundles reach the points 135, Fig. 12, the broken lines in said figure indicating the distance the cam is moved at each operation of the Geneva movement. As the tube or blank is forced backward, the dies will be moved by the mechanism already described to a closed position to engage the tube but only after the latter is at rest. This places the tube in position to have the device 73 force a part thereof outward into the outer die members 75 and 76. The device 73 is given one complete rotary movement through the spindle 70 and the pinion 78 and segmental gear 79 so as to form the rib or bulged portion on the body of the tube. After the device 73 has formed the rib, the Geneva movement for rotating the cams 59 is again operated to give a second throw to the said cams 59 which will cause the first toe 105 to force the yokes or rods 51 outward to cause the rolled part or rib portion of the tube to be forced into the grooves 101 of the inner split die members 84 and 85, and on further movement of the crimp cams 59, the part 106 thereof will positively force the chuck in the opposite direction to withdraw the crimped part of the tube clear of the inner die members. As the die is being closed, the washer wiper 122 is being forced outward, being in constant motion, and practically gets all the way back at the forward movement of the chuck to telescope the metal thereby preventing any tendency of the tube to collapse inwardly and serving to wipe the tube true. The inner split die members are held against outward movement for an interval of time during the forcing forward of the tubular blank and until the bulged or rib portion of the blank, as shown in Fig. 51, has a part thereof defined so that the telescoping of the metal will be certain, at which time the holder or stop 107 is removed from engagement with the inner dies in order that the mechanism already described may be permitted to operate the inner split die members on their pivots to move outward during the crimping of the blank through the operation of the arms 116 and their connection with said die members, as the said arms are moved by the cam surface 121 on the cam 121ᵃ. The die members are opened after the blank has been forced forward and returned to remove the crimped portion from the grooves 101 of the inner split die members, and as the tube is moved back, the inner die members are swung into position again by the mechanism already described. The tube is now forced forward in position for the device 73 to form a second rib when the die is again closed ready to complete the second crimp. This action of the die in closing serves to force the crimped part of the blank or tube previously made into close contact with the body portion as shown in Fig. 53, and a second rib is formed by the device 73 as in said figure. The tube is now forced forward and back to complete the next crimp by means of the second toe 137 when the cams 59 have been again rotated through the Geneva movement, the wiper and inner die members acting as hereinbefore set forth. The grooves in the crimp cams 59 between the toes 105 are such as will permit the proper drawing of the metal while being crimped, as the chuck 15 will yield through the spring 45. The cams 59 will continue to have a step-by-step movement imparted thereby by the mechanism already explained, and a succession of crimps will be formed in the tube, the angle of which will vary according to the number of crimps as will be readily seen from the drawings in Figs. 54 to 58. The length of tube is varied according to the number of crimps it is desired to place in the blank, but for each tube having a different number of crimps, different cams 59 are provided therefor having movements to correspond to the number of crimps desired, otherwise the machine needs no change to form blanks with one or more crimps.

The main drive shaft 64 may be connected with the gear 66, so that the said shaft may be given one complete rotation and then stopped, and the said machine may be started either by a treadle or by a lever. As shown an operating lever 138 is pivoted at 139, and this lever carries a pawl or dog 140 forming a means to engage a part of the clutch 141, Figs. 6 to 8, so that the drive shaft 64 may be given one movement and then stopped or the said clutch may be made to operate the shaft 64 continuously until the elbow with its succession of crimps has been formed. The clutch is of the usual or of any preferred construction. A collar 142 is secured to the shaft 64 and this collar carries a pawl 143 which is adapted to engage the teeth 144 forming a part of the gear 66, and carried by the collar 142 is a spring 145 which is arranged to force the pawl at the proper time into engagement with the teeth 144. The pawl 143 is pivoted to the collar 142 and has one end adapted to be engaged by a spring-pressed bolt 146. This bolt 146 is normally forced outward by the spring 147 which is of greater tension than the spring 145, and said bolt is arranged in a boss 148 carried by a disk 149 which is loosely arranged on the shaft 64 and which carries the stop or tooth to be engaged by the pawl 140. The spring 145 normally forces the pawl 143 into engagement with one of the teeth 144 of the gear 66, the stop 150 carried by the disk 149 at this time engaging the projection or tooth 151 of the collar 142, and the pin or bolt 146 resting against a part of the pawl 143. When the pawl 140 engages the tooth or disk 149, it will stop the same from rotating and will also stop the parts carried thereby. The pin or bolt 146 will now compress the spring 145 and will force the pawl 143 out of engagement with the teeth 144, allowing the gear 66 to rotate independent of the drive shaft 64.

When the machine is to make a succession of movements to form a series of crimps, the shaft 64 may be given a determined number of rotary movements and then stopped. To secure this when the pawl 140 is moved away from engagement with the clutch member to operate the shaft 64 by the movement of the hand-lever 138, an arm 152, Fig. 1, is moved therewith which is adapted to be engaged by the hooked end 153 of a pawl 154. This pawl or dog is pivotally held at 155 to a bracket 156 and is normally forced into engagement or toward the arm 152 by a spring 157, the arm 152 and operating lever 138 being normally forced to throw the pawl or dog 140 into engagement with the stop of the clutch by the spring 158. An arm 159 is movable with the pawl or dog 154 and this arm is adapted to be engaged by an adjustable screw or stop 160 held in a bracket 161 and secured to one of the yokes or rods 51, so that when the chuck 15 and rods or yokes 51 are moved outward to form the last crimp, the stop 160 will engage the arm 159 and will release the dog 154 from the arm 152 thereby permitting the spring 158 to force the dog 140 in position to stop the movement of the shaft 64. By this means the entire elbow may be made entirely automatic. The blank after the succession of crimps have been formed and the elbow properly bent at the desired angle, may be placed in another machine to have the seams properly fastened and the whole elbow may be galvanized to prevent leakage or the elbow may be otherwise handled as desired.

From the foregoing it will be seen that a simple and efficient machine is provided whereby tubular blanks may be bent at various angles and the surplus material taken care of during the bending by means working entirely automatic after the blank has been placed in the machine and properly held; that effective and positive gripping means for holding the blank and to move the same through the several operations to form the crimp is provided; that the blank is so held that the same will give properly without unnecessary strain on the metal during the formation of the elbow; that an effective cam movement is provided for moving the tube gripping means; that an effective die is provided whereby the blank or tube may be properly grasped and supported during the gripping and bending operation; that simple means is provided for forming a crimp and for sustaining the blank so as to keep the same of a uniform diameter; and that simple mechanism is provided whereby certain members of the die may be positively moved as the elbow or pipe is being made.

Having thus described our invention, we claim as new and desire to secure by Letters Patent:—

1. In a bending machine, the combination with a mandrel adapted to support the tube to be bent, of a slidingly held gripping device adapted to move along the mandrel, a die having a plurality of members and having means whereby a part of the metal may be forced into the die to form a crimp, an eccentrically arranged rotary device adapted to force a part of the tube into the die to provide a rib on one side of the body of the tube, a slidingly held wiper adapted to move within the tube to sustain the circular form thereof, means for positively moving certain members of the die to compensate for the curvature of the tube during the crimping and bending operation, together with mechanism for automatically actuating the several parts to form a succession of crimps.

2. In a bending machine, the combination with a support adapted to hold the tube to be bent, of a movable gripping device, a die having a plurality of members and having means whereby a part of the metal may be forced into the die to form a crimp, an eccentrically arranged rotary device adapted to force a part of the tube into the die to provide a rib on one side of the body of the tube, means for forcing the tube to cause the rib to be telescoped to form a crimp, a reciprocatory wiper movable within the tube and die, means for positively moving certain members of the die to compensate for the curvature of the tube during the crimping and bending operation, together with mechanism for automatically actuating the several parts to form a succession of crimps and simultaneously bend the tube.

3. In a bending machine, the combination with a mandrel adapted to support the tubular blank, of a movable gripping device adapted to carry the blank therewith, a slidingly held wiper adapted to move within the tubular blank to sustain its circular form, a die having a plurality of members moving in parallel relation and having means whereby a part of the metal may be forced into the die to form a crimp, a device adapted to force a part of the blank into the die to provide a rib on one side of its body, means for telescoping the rib by the movement of the blank, together with mechanism for actuating the several parts to form a plurality of crimps.

4. In a machine of the character described, the combination with a support adapted to hold the tube to be bent, of a gripping device adapted to move along the support, a slidingly held wiper adapted to move within the tube to sustain its circular form, a die having a plurality of members moving in parallel relation and having means whereby a part of the metal may be forced into the die to form a crimp, an eccentrically arranged rotary device adapted to force a part of the tube into the die to provide a rib on one side of the body of the tube, and means for collapsing the rib to form a crimp.

5. In a bending machine, the combination with a support for the tube to be bent, of a slidingly held gripping chuck adapted to move along the mandrel, a die having a plurality of members, one set of members moving at right angles to the other, means being provided for intermittently locking said members, and means coöperating with the die and chuck for forming a plurality of crimps in the tube.

6. In a bending machine for forming elbows, the combination with a mandrel adapted to support the tube to be bent, means for moving the tube along the mandrel, a die, a device adapted to force a part of the tube into a recess formed in a pivoted element of the die to provide a rib on one side of the body of the tube, and a reciprocatory wiper for preventing the inward collapsing of the tube.

7. In a bending machine, the combination with supporting means for the tube, of means for gripping the tube and for moving the same along its support, a split die having laterally movable members and two pivotally held members each provided with a groove deeper at one part and tapering to nothing at another, means for moving the pivotal members and means for intermittently locking said members, together with mechanism for automatically moving the gripping means to force the metal into the groove of the pivotal members and to remove the same therefrom.

8. In a bending machine, the combination with supporting means for the tube, of means for gripping the tube and for moving the same along its support, a split die having members each provided with a groove deeper at one part and tapering to nothing at another, together with means for moving the gripping means to force the metal into the groove of the die members and to remove the same therefrom.

9. In a bending machine, the combination with supporting means for a tube, of means for moving the tube, a split die having two pivotally held members each provided with a groove, and means for operating the tube moving means to force the metal into the groove of the pivotal members.

10. The combination with a mandrel having means for supporting a tubular blank, of a split die having two outer members laterally movable and each having a recessed part, an eccentrically arranged rotary device adapted to force a part of the metal into the recessed parts of the outer die members to form a rib on one side of the body portion of the tube, two pivotally held inner die members, one for each of the outer die members and each inner pivotal member being provided with a groove which is deeper at the upper portion of said inner members and tapers downward and outward and is adapted to receive the metal caused by the movement of the eccentric device and to crimp the material, means for forcing the ribbed part of the tube into the groove of the pivotally held members and to remove the same therefrom, a reciprocatory wiper movable within the die, means whereby the pivotally held inner die members may be moved on their pivots during the crimping, and means for automatically moving the parts to form a succession of crimps and to change the angle of bending as the crimps are formed.

11. The combination with a mandrel having means for supporting a tubular blank, of a split die having two outer members laterally movable and each having a recessed part, a rotary device adapted to force a part of the metal into the recessed part of the outer die members to form a rib on one side of the body portion of the tube, two pivotally held inner die members one for each of the outer die members and each inner pivotal member being provided with a groove which is deeper at the upper portion of said inner member and tapers downward and outward and is adapted to receive the metal caused by the movement of the rotary device and to crimp the material, and means for forcing the ribbed part of the tube into the groove of the pivotally held members and to remove the same therefrom.

12. The combination with a support having means for holding a tubular blank, of a split die having two outer members and each having a recessed part, a device adapted to force a part of the metal into the recessed parts of the outer die members to form a rib on one side of the body portion of the tube, two pivotally held inner die members one for each of the outer die members and each inner pivotal member being provided with a groove which is deeper at one part of said inner members and tapers outward and is adapted to receive the metal caused by the movement of the device, means for forcing the ribbed part of the tube into the groove of the pivotally held members and to remove the same therefrom, and a reciprocatory wiper movable within the die.

13. The combination with means for supporting a tubular blank, of a split die having two outer members laterally movable and each having a recessed part, an eccentrically arranged rotary device adapted to force a part of the metal into the recessed parts of the outer die members to form a rib on one side of the body portion of the tube, two inner die members one for each of the outer die members and each inner member being provided with a groove which is deeper at the upper portion of said inner members and tapers downward and outward and is adapted to receive the metal caused by the movement of the eccentric device and to crimp the material, and means for forcing the ribbed part of the tube into the grooves of the inner die members and to remove the same therefrom.

14. The combination with means for supporting the tube to be bent, of a split die having two outer members laterally movable and each having a recessed part, an eccentrically arranged rotary device adapted to force a part of the metal into the recessed parts of the outer die members to form a rib on one side of the body portion of the tube, two pivotally held inner die members one for each of the outer die members and each inner pivotal member being provided with a groove which is deeper at the upper portion of said inner members and tapers downward and outward and is adapted to receive the metal caused by the movement of the eccentric device and to crimp the material, means for forcing the ribbed part of the tube into the groove of the pivotally held members to collapse the same and to remove the tube therefrom, a reciprocatory wiper movable within the die, and means whereby the pivotally held inner die members may be moved on their pivots during the crimping.

15. The combination with a tubular mandrel, of a gripping chuck adapted to positively hold the blank, yielding means for forcing the chuck in one direction, cams for positively moving the chuck backward and forward, a split die having member movable toward and from the tube to be bent and having means to form a crimp in the tube, said die having pivotally held members, a holder movable in the path of said pivotally held members to hold the same against movement for a time at the start of the crimp, means for moving said holder, together with means for positively moving the pivotally held members of the die to permit the tube to bend properly while being crimped.

16. The combination with a supporting mandrel, of a gripping chuck adapted to positively hold the blank, yielding means for forcing the chuck in one direction along the mandrel, cams for positively moving the chuck backward and forward, a split die having members movable toward and from the tube to be bent and having means to form a crimp in the tube, said die having pivotally held members, a holder movable in the path of said pivotally held members to hold the same against movement for a time at the start of the crimp, and means for moving said holder.

17. The combination with supporting means for a blank, of a gripping device adapted to positively hold and move the blank, a split die having members movable toward and from the tube to be bent, said die having pivotally held members, means cooperating with the die to form a crimp, and a holder movable in the path of said pivotally held members to hold the same against movement for a time at the start of the crimp.

18. The combination with supporting means for a blank, of a gripping chuck adapted to positively hold and move the blank, yielding means for forcing the chuck in one direction, means for positively moving the chuck backward and forward, a split die having pivotally held members, means cooperating with the die to form a succession of crimps, a holder movable in the path of said pivotally held members to hold the same against movement for a time, means for moving said holder, together with means for positively moving the pivotally held members of the die to assist the tube to bend properly during the crimping operation.

19. The combination with a mandrel having means to support a tube to be bent, of a gripping chuck, a rod connected to the chuck, a flexible connection, a spring normally forcing the rod in one direction, cam devices for positively forcing the chuck along the mandrel to carry the tube to be bent therewith, and means cooperating with the chuck to form a succession of crimps in the tube on one side thereof and to force the crimped part in close contact with the body of the tube.

20. The combination with means to support a tube to be bent, of a gripping chuck, means for forming a succession of crimps in the tube, a rod connected to the chuck, a flexible connection, a spring normally forcing the rod in one direction, means for positively forcing the chuck along the supporting means to carry the tube therewith, and means cooperating with the chuck to form a succession of crimps in the tube on one side thereof and to force the crimped part in close contact with the body of the tube.

21. The combination with a mandrel having means to support a tube to be bent, of a gripping chuck, means for forming a succession of crimps, a rod connected to the chuck, a chain, a spring normally forcing the chain and rod in one direction, and cam devices for positively forcing the chuck along the mandrel to carry the tube therewith.

22. The combination with means to support a tube to be bent, of a slidingly held gripping chuck, a rod connected to the chuck, a flexible connection, a spring normally forcing the rod and chuck in one direction, means for positively forcing the chuck along the supporting means to carry the tube therewith, and means cooperating with the chuck to form a succession of crimps in the tube on one side thereof and to force the crimped part in close contact with the body of the tube.

23. In a bending machine, the combination with a mandrel adapted to support the tube to be bent, of a gripping device slidingly held on said mandrel, means for moving the device along the mandrel, a slidable wiper adapted to move within the tube to sustain its circular form, and a split die having parts movable toward and from each other, means coöperating with the die to form a crimp in the body of the metal at one side thereof and means for intermittently locking said crimping means, said die having means whereby the crimped part of the metal may be forced in close contact with the body thereof.

24. In a bending machine, the combination with a mandrel adapted to support the tube to be bent, of a gripping device held on said mandrel, means for moving the device along the mandrel, a slidable wiper adapted to move within the tube to sustain its circular shape, a split die having movable members, and means coöperating with the die to form a crimp in the body and to force the crimped part of the metal in close contact with the body thereof, and a reciprocating member adapted to prevent the collapsing of the tube as the same is crimped.

25. In a bending machine, the combination with a mandrel adapted to support a metallic tubular blank, of a die having a plurality of members, a chuck slidingly held on the mandrel, a rotary element having a spiral tooth on opposite sides thereof and held to rotate in the head about the mandrel, said rotary element having teeth on the periphery thereof, a pinion having teeth in mesh with the teeth of the rotary element, means for rotating the pinion, a plurality of jaws having an extended engaging part and arranged in sets and each set having teeth to be engaged by the rotary element, one of said sets being movable by the spiral tooth on one side of the rotary element to move the jaws engaged thereby in one direction, and the jaws of the other set being engaged and moved by the spiral tooth on the opposite side of the rotary element so as to be moved in the opposite direction to grip the end of the tube to be bent positively and rigidly between the jaws, and means coöperating with the chuck to form a plurality of crimps and to bend the tube to form an elbow.

26. In a bending machine, the combination with means adapted to support a metallic tubular blank, of a slidable wiper adapted to move within the tube to sustain its circular form, a die having a plurality of members one set of members being adapted to move at right angles to the other, a chuck movable on said support, two independently movable sets of jaws movable in opposite directions and adapted to grip the end of the tube between them, and means coöperating with the chuck to form a plurality of crimps and to bend the blank to form an elbow.

27. In a bending machine, the combination with means adapted to support a metallic tubular blank, of a die having a plurality of members, a movable chuck, a rotary element held to rotate in the chuck, said rotary element having teeth on the periphery thereof, a pinion having teeth in mesh with the teeth of the rotary element, means for rotating the pinion, a plurality of jaws having an extended engaging part and arranged in sets, means whereby the rotary element may cause the two sets of jaws to move in opposite directions, and means coöperating with the chuck to form a plurality of crimps in the blank.

28. In a bending machine, the combination with a mandrel adapted to support a metallic tubular blank, of a die, a chuck held on the mandrel, a rotary element having a spiral tooth on opposite sides thereof and held to rotate in the chuck about the mandrel, means for rotating the element, a plurality of jaws having an extended engaging part and arranged in sets, means whereby the spiral teeth of the rotary element may move two sets of jaws in opposite directions to grip the end of the tube to be bent positively and rigidly between the jaws, and means coöperating with the chuck to form a plurality of crimps and to bend the blank to form an elbow.

29. The combination with supporting means for a tubular blank, of a chuck adapted to grip the blank and slidingly held on said support, means coöperating with the chuck to crimp and bend the tube, a rod connected to the chuck, a collar secured to the rod, a cylinder, a plunger movable in the cylinder about the rod, a spring yieldingly forcing the plunger in one direction, means for controlling the outlet or inlet of the air into the cylinder, said plunger adapted to be engaged by the collar on the rod, a flexible connection held to the rod, a pulley about which the flexible connection passes, a spring normally forcing the flexible connection and rod in one direction, and means for positively forcing the chuck against the action of the spring.

30. The combination with supporting means for a tubular blank, of a chuck adapted to grip the blank and held on said support, means coöperating with the chuck to crimp and bend the blank, a rod connected to the chuck, a collar secured to the rod, a cylinder, a plunger movable in the cylinder about the rod, a spring yieldingly forcing the plunger in one direction, means for controlling the outlet or inlet of the air into the cylinder, said plunger being adapted to be engaged by the collar on the rod, means tending normally to force the chuck and rod in one direction, and means for positively forcing the chuck in the opposite direction.

31. The combination with supporting means for a tubular blank, of a chuck adapted to grip the blank and movably held on said support, means coöperating with the chuck to crimp and bend the blank, a rod connected to the chuck, a cylinder, a plunger movable in the cylinder about the rod, means for controlling the outlet or inlet of the air into the cylinder, said plunger adapted to be engaged and moved by the movement of the chuck, a spring normally forcing the rod and chuck in one direction, and means for positively forcing the chuck against the action of the spring.

32. The combination with supporting means for a tubular blank, of a chuck adapted to grip the blank and slidingly held on said support, means coöperating with the chuck to crimp and bend the tube, pneumatic means for taking up the shock of the movement of the chuck when moved in one direction, a spring normally forcing the chuck in one direction, and means for positively forcing the chuck against the action of the spring.

33. The combination with supporting means for a tubular blank, of a chuck adapted to grip the blank and slidingly held on said support, means coöperating with the chuck to crimp and bend the tube, a rod connected to the chuck, a collar about the rod, a spring yieldingly forcing the plunger in one direction, means for controlling the outlet or inlet of the air into the cylinder, said plunger being adapted to be engaged by the collar on the rod, a flexible connection held to the rod, and a spring normally forcing the flexible connection and rod in one direction.

34. In a bending machine, the combination with a mandrel adapted to support a tubular blank, of a chuck adapted to grip the end of a blank and held to slide on the mandrel, means coöperating with the chuck to form a plurality of crimps and to bend the metal tube to form an elbow, a cam mechanism having a cam groove provided with a plurality of engaging parts, yokes connected to the chuck and having trundles movable in the grooves, and means for imparting a step-by-step movement to the cams to cause the engaging parts to positively move the chuck back and forth along the mandrel.

35. In a bending machine, the combination with means to support a tubular blank, of a chuck adapted to grip the end of a blank and held to move on the supporting means, means coöperating with the chuck to form a plurality of crimps and to bend the metal tube to form an elbow, a cam mechanism having a cam groove provided with a plurality of engaging parts, means connecting the chuck to be operated by the cams, and means for imparting a step-by-step movement to the cams to cause the engaging parts to positively move the chuck back and forth along the supporting means.

36. In a bending machine, the combination with a chuck adapted to grip the end of a tubular blank, of means coöperating with the chuck to form a plurality of crimps and to bend the metal tube to form an elbow, cams having cam grooves provided with a plurality of engaging parts, yokes connected to the chuck and having trundles movable in the grooves, and means for imparting a step-by-step movement to the cams to cause the engaging parts to positively move the chuck back and forth.

37. In a bending machine, the combination with a mandrel having a plurality of bars spaced apart and extending lengthwise of the mandrel, some of said bars comprising two members between which the tube to be bent is placed the end portions of said rods being connected by an annular member, of a gripping chuck held on the mandrel and coöperating therewith to support the tube, and means for forming a succession of crimps in the tube and for bending the same to form an elbow.

38. In a bending machine, the combination with a mandrel having a plurality of bars spaced apart and extending lengthwise of the mandrel, some of said bars comprising two members between which the tube to be bent is placed means connecting the end portions of said bars, and means for forming a succession of crimps in the tube and for bending the same to form an elbow.

39. In a bending machine, the combination of a stationary mandrel adapted to support the tube to be bent, a die, gripping means, an eccentrically held device movable within the die and adapted to force a part of the metal into the die, and a movable element adapted to reciprocate within said mandrel to support the interior of said tube.

40. In a bending machine, the combination of a stationary mandrel adapted to support a tube to be bent, a slidably held wiper adapted to move within the tube to preserve its circular form, a die, means for moving the tube, and a device movable within the die and adapted to force a part of the metal into a pivoted portion of the die.

41. The combination with a support for a tubular blank, of a chuck held on said support and adapted to grip the tubular blank, a die, a spindle rotatably held in the support, means for intermittently moving the spindle, a device held to the spindle and having an eccentric movement when the latter is rotated to force a part of the metal into the die to provide a rib on one side thereof, and means whereby the rib thus formed may be telescoped and forced in close contact with the body of the tube.

42. The combination with a support for a tubular blank, of a chuck held on said support and adapted to grip and move the tubular blank, a die, a spindle rotatably held in the support, means for intermittently rotating the spindle, a device held to the spindle and having a movement when the latter is rotated to force a part of the metal into the die to provide a rib on one side thereof, and means whereby the rib thus formed may be telescoped.

43. In a bending machine, the combination with a support for a tubular blank, of means for forming a succession of crimps in the tube and simultaneously bending the same to form an elbow, and a reciprocatory wiper having a head and a number of washers held in the head to be independently movable therein to adapt the same to conform to the bending of the blank.

44. In a bending machine, the combination with a support for a tubular blank, of means for forming a plurality of crimps in the tube to form an elbow, and a wiper having a number of devices held in the head to be independently movable therein to adapt the same to conform to the bending of the blank.

45. In a bending machine, the combination with a support for a tubular blank, of means for forming a succession of crimps in the tube, and a wiper having a head and a number of circular devices held in the head to be movable therein to adapt the same to conform to the bending of the blank.

46. In a bending machine, the combination with a support for a tubular blank, of means for forming a succession of crimps in the tube and simultaneously bending the same to form an elbow, and a device having a plurality of independently movable washers to adapt the same to conform to the bending of the blank.

47. In a bending machine, the combination with means for bending a tubular blank, of a reciprocatory device movable within the blank and comprising a head having a plurality of independently movable washer elements held in said head, a rod secured to said head, a vertically arranged shaft, an eccentric held to said shaft, a strap operatively connecting the eccentric to the rod, a drive shaft, and a spiral gear connection between the drive shaft and the vertically arranged shaft whereby a reciprocatory movement may be imparted to the device during the bending and forming operation of the elbow.

48. In a bending machine, the combination with means for bending a tubular blank, of a device movable within the blank and comprising a head having a plurality of independently movable and floating washer elements held in said head, a rod secured to said head, a vertically arranged shaft, an eccentric held to said shaft; a strap operatively connecting the eccentric to the rod, and means for operating said shaft.

49. In a bending machine, the combination with a support for a tubular blank, of gripping means adapted to move said blank, a die having two outer members movable laterally with respect to each other and adapted to fit about the tubular blank, one of said die members being provided with pins adapted to enter openings in the other die member, said outer die members being recessed on one side to a greater extent than the other to adapt the metal to be forced into said recess to form a rib, means for forcing the metal into said recessed part, an inner member pivotally held to each of the outer members and movable on its pivots lengthwise and in the direction of bend of the blank, each of said pivotal inner members being provided with a groove at their inner edge which gradually tapers to nothing, means for forcing the metal of the blank into the grooves of said pivotal members and to remove the blank therefrom to form crimps, means for positively moving the pivotally held members on their pivots, and means for moving the outer members and pivotally held members toward and from the tube.

50. In a bending machine, the combination with a support for a tubular blank, of gripping means adapted to move said blank, a die having two outer members movable laterally with respect to each other and adapted to fit about the tubular blank, said outer die members being recessed on one side to a greater extent than the other to adapt the metal to be forced into said recess to form a rib, means for forcing the metal into said recessed part, an inner member pivotally held to each of the outer members and movable on the pivots lengthwise of the blank and in the direction of bend, each of said pivotal inner members being provided with a groove at their inner edge which gradually tapers to nothing, means for forcing the metal of the blank into the grooves of said pivotal members to form crimps, and means for moving the outer members and pivotally held members toward and from the tube.

51. In a bending machine, the combination with means for supporting tubular blanks to form elbows, of a die having a plurality of members, a link connected to each die member, a rock shaft, an arm connecting the link to move with the rock shaft, an arm secured to the shaft, a rocking lever having outwardly-extending arms, links connecting the arms of the lever to the arms on the rock shafts, and a cam for rocking the lever to force the die members toward or from each other and members pivotally held within said die members together with means for limiting their movement.

52. In a bending machine, the combination with means for supporting tubular blanks to form elbows, of a slidably held wiper adapted to move within the blank, means for moving the blank, a die having a plurality of members adapted to move in parallel relation, and means for moving the die members toward and from each other about the tubular blank.

53. In a bending machine, the combination with means for supporting a tubular blank to form an elbow, of a die having a plurality of members, a link connected to each die member, a rock shaft, an arm connecting each link to move with one of the rock shafts, an arm secured to each shaft, a rocking lever having outwardly-extending arms, links connecting the arms of the lever to the arms on the rock shaft, and means for rocking the lever to force the die members toward or from each other and members pivotally held within said die members, said members being adapted to move at right angles to said die members.

54. In a bending machine, the combination with a support for a tubular blank, of a die having a plurality of outer members and inner die members pivotally held to the outer die members and movable therewith, means coöperating with the die to form a succession of crimps in the tubular blank, arms connected to the pivotally held members of the die, rods, means connecting the rods to the arms of the die members, arms pivotally held at one end and connected together at their inner ends and so held that the rods will raise or lower the arms when the dies are forced inward or outward, springs forcing the arms in one direction, and a cam adapted to move the arms and thereby the pivotally held members of the die to permit the pivoted members to compensate for the bending of the blank as the crimps are formed.

55. In a bending machine, the combination with a support for a tubular blank, of a die having a plurality of outer members and inner die members pivotally held to the outer die members and movable therewith, means coöperating with the die to form a plurality of crimps in the tubular blank, arms pivotally held at one end and connected together at their inner ends, means for operatively connecting the arms to the pivoted die members so as to be raised or lowered when the dies are forced inward or outward, and a cam adapted to move the arms and thereby the pivotally held members of the die to permit said members to compensate for the bending of the blank as the crimps are formed therein.

56. In a bending machine, the combination with a support for a tubular blank, of a die having a plurality of outer members and inner die members pivotally held to the outer die members and movable therewith, means coöperating with the die to form a succession of crimps in the tubular blank, rods operatively connected to the pivotally held members of the die, arms pivotally held at one end and connected together at their inner ends and so held to the rods that the latter will raise or lower the arms when the dies are forced inward or outward, and means adapted to move the arms and thereby the pivotally held members of the die to compensate for the bending of the blank as the crimps are formed therein.

57. In a bending machine the combination with a support for the tube to be bent, of a slidingly held gripping chuck adapted to move along said support, a die having a plurality of members, said die being provided with a portion in which a rib is adapted to be formed and having a member in which said rib is adapted to be collapsed upon movement of the tube relatively of the die, means coöperating with said first-named portion of the die to form a rib and for moving the tube to collapse said rib, and means for freeing the collapsed rib from said member.

58. In a bending machine the combination with a support of a slidingly held gripping device adapted to move along the support and carry the tube therewith, a die having a plurality of members, said die being provided with a portion in which a rib is adapted to be formed and having a movable member in which said rib is adapted to be collapsed upon movement of the tube relatively of the die, means coöperating with said first-mentioned portion of the die to form a rib and for moving the tube to collapse said rib and cam means for freeing the collapsed rib from said member.

59. In a bending machine the combination with a support for the tube to be bent, a slidingly held gripping chuck adapted to be moved along said support, a die having a plurality of members, said die being provided with a portion in which a rib is adapted to be formed and having a pivoted member in which said rib is adapted to be collapsed upon movement of the tube relative of the die, means for coöperating with said first-named portions of the die to form a rib and for moving the tube to collapse said rib and means for freeing the collapsed rib from said member.

60. In a bending machine the combination with a support for the tube to be bent, a slidingly held gripping chuck adapted to be held along said support, a die having a plurality of members, said die being provided with a portion in which a rib is adapted to be formed and having a pivoted member in which said rib is adapted to be collapsed, means coöperating with said first-mentioned portions of the die to form a rib and for moving the tube to collapse said rib, and means for freeing the collapsed rib from said member.

61. In a bending machine the combination with a support for the tube to be bent, of a slidingly held gripping mechanism adapted to move along said support, a two-part die adapted to engage said tube, means for forming a rib on a portion of said tube and pivoted members located within said die members for collapsing said rib.

62. In a bending machine the combination with a support for the tube to be bent, a mechanism for sliding said tube along said support, a die having a plurality of members one set of members being adapted to move in a straight line, a second set of members pivotally supported within the first-mentioned members, and cam means for intermittently locking said pivoted members.

63. In a bending machine the combination with a support for the tube to be bent, a mechanism for sliding said tube along said support, a die having a plurality of members one set of members being adapted to move in a straight line, and a second set of members pivotally supported within the first-mentioned members, guide ways being provided for directing the movement of said members.

BENJAMIN W. TUCKER.
THEODORE F. OECHSLE.

Witnesses:
E. T. WILKINSON,
GEORGE V. JAMES.